US012000153B2

(12) United States Patent
Baltz, Jr.

(10) Patent No.: US 12,000,153 B2
(45) Date of Patent: Jun. 4, 2024

(54) CASING BEAD APPARATUS

(71) Applicant: Alabama Metal Industries Corporation, Birmingham, AL (US)

(72) Inventor: Gary George Baltz, Jr., Mountain Brook, AL (US)

(73) Assignee: Alabama Metal Industries Corporation, Birmingham, AL (US)

( * ) Notice: Subject to any disclaimer, the term of this patent is extended or adjusted under 35 U.S.C. 154(b) by 137 days.

(21) Appl. No.: 17/645,759

(22) Filed: Dec. 23, 2021

(65) Prior Publication Data

US 2022/0205250 A1 Jun. 30, 2022

Related U.S. Application Data

(60) Provisional application No. 63/202,518, filed on Jun. 15, 2021, provisional application No. 63/131,041, filed on Dec. 28, 2020.

(51) Int. Cl.

| | |
|---|---|
| ***E04F 13/06*** | (2006.01) |
| ***E06B 1/68*** | (2006.01) |
| *E04F 19/06* | (2006.01) |
| *E06B 1/62* | (2006.01) |

(52) U.S. Cl.

CPC ................ *E04F 13/06* (2013.01); *E06B 1/68* (2013.01); *E04F 2013/063* (2013.01); *E04F 19/061* (2013.01); *E06B 1/62* (2013.01)

(58) Field of Classification Search

CPC ... E04F 13/06; E04F 2013/063; E04F 19/061; E06B 1/68; E06B 1/62; E06B 2001/624

See application file for complete search history.

(56) References Cited

U.S. PATENT DOCUMENTS

| | | | |
|---|---|---|---|
| D26,201 | S | 10/1896 | Turner |
| 1,170,968 | A | 2/1916 | Elgin |
| 1,204,955 | A | 11/1916 | Day |
| 2,151,605 | A | 3/1939 | Lavering |
| 2,272,762 | A | 2/1942 | Awbrey |
| D151,022 | S | 9/1948 | Weber et al. |
| 3,375,623 | A | 4/1968 | Buhler |

(Continued)

FOREIGN PATENT DOCUMENTS

| | | | | |
|---|---|---|---|---|
| CA | 2666118 | A1 * | 11/2010 | .............. E04F 13/06 |
| CA | 2983532 | A1 * | 4/2018 | ............ E04F 13/045 |

(Continued)

*Primary Examiner* — Phi D A

(74) *Attorney, Agent, or Firm* — HONIGMAN LLP

(57) ABSTRACT

A casing bead apparatus includes a base panel with at least one opening through the base panel. With the apparatus mounted at a vertical wall, the base panel is disposed along the vertical wall. A stop bead wall extends from the base panel. The stop bead wall includes a first side, a second side opposite the first side, and a flange at a distal end of the stop bead wall distal from the base panel and extending partially over the base panel. A spacing element is disposed at the second side of the stop bead wall. An adhesive element is disposed at the spacing element. With the apparatus mounted at the vertical wall, the adhesive element engages a horizontal surface perpendicular to the vertical wall to adhesively attach the apparatus at the horizontal surface and the spacing element is disposed between the stop bead wall and the horizontal surface.

11 Claims, 29 Drawing Sheets

(56) References Cited

U.S. PATENT DOCUMENTS

| | | | | | |
|---|---|---|---|---|---|
| 3,383,818 | A | | 5/1968 | Tatum | |
| 3,606,714 | A | | 9/1971 | Arnett | |
| 3,667,174 | A | | 6/1972 | Arnett | |
| 3,754,367 | A | | 8/1973 | O'Konski et al. | |
| 3,964,220 | A | | 6/1976 | Rutkowski et al. | |
| 4,624,087 | A | | 11/1986 | Schneller | |
| 4,651,488 | A | | 3/1987 | Nicholas et al. | |
| 4,785,601 | A | | 11/1988 | Tupman | |
| D299,963 | S | | 2/1989 | Callahan | |
| 5,045,374 | A | * | 9/1991 | Tucker | E04F 19/028 428/192 |
| 5,063,720 | A | | 11/1991 | Bifano et al. | |
| 5,263,294 | A | | 11/1993 | Koenig et al. | |
| D344,596 | S | | 2/1994 | McArthur | |
| 5,313,755 | A | * | 5/1994 | Koenig, Jr. | E04F 13/06 52/417 |
| 5,423,154 | A | * | 6/1995 | Maylon | E04F 13/047 52/717.06 |
| 5,579,617 | A | | 12/1996 | Schiedegger | |
| 5,579,623 | A | | 12/1996 | Stark et al. | |
| 5,761,866 | A | | 6/1998 | Maylon | |
| 6,338,229 | B1 | | 1/2002 | Botzen | |
| D456,528 | S | | 4/2002 | Maylon et al. | |
| D459,007 | S | | 6/2002 | Campacci | |
| D471,991 | S | | 3/2003 | Maylon et al. | |
| D477,420 | S | | 7/2003 | Butcher | |
| 6,609,341 | B2 | | 8/2003 | Maylon et al. | |
| 7,406,805 | B1 | | 8/2008 | Larson | |
| 7,634,883 | B1 | | 12/2009 | Larson | |
| 8,584,416 | B2 | | 11/2013 | Chenier | |
| D700,717 | S | | 3/2014 | Campacci | |
| D703,306 | S | | 4/2014 | Little | |
| D703,307 | S | | 4/2014 | Little | |
| 9,062,453 | B1 | * | 6/2015 | Maziarz | E04F 13/06 |
| D740,969 | S | | 10/2015 | Di Marzio | |
| D750,809 | S | | 3/2016 | Shaw | |
| D761,971 | S | | 7/2016 | Apanovich et al. | |
| D762,310 | S | | 7/2016 | Apanovich | |
| D787,091 | S | | 5/2017 | Singh | |
| D797,956 | S | | 9/2017 | Shaw | |
| D800,344 | S | | 10/2017 | Apanovich | |
| D800,921 | S | | 10/2017 | Apanovich | |
| D815,757 | S | | 4/2018 | Braun | |
| D835,813 | S | | 12/2018 | Lee | |
| D842,496 | S | | 3/2019 | Apanovich | |
| D861,196 | S | | 9/2019 | Apanovich | |
| D872,905 | S | | 1/2020 | Jones | |
| 10,655,336 | B2 | | 5/2020 | Friel | |
| D904,645 | S | | 12/2020 | Reed | |
| D904,646 | S | | 12/2020 | Reed | |
| 10,947,722 | B2 | | 3/2021 | Baltz, Jr. et al. | |
| D923,821 | S | | 6/2021 | Baltz, Jr. et al. | |
| 2005/0115189 | A1 | | 6/2005 | Leffler | |
| 2008/0104918 | A1 | | 5/2008 | Gleeson | |
| 2008/0148672 | A1 | | 6/2008 | Monteer | |
| 2008/0263971 | A1 | * | 10/2008 | Maziarz | E04F 13/06 52/204.1 |
| 2009/0183453 | A1 | | 7/2009 | Koessler | |
| 2013/0104481 | A1 | | 5/2013 | Urban, Jr. et al. | |
| 2016/0340908 | A1 | * | 11/2016 | Apanovich | E04F 21/02 |
| 2016/0348357 | A1 | * | 12/2016 | Smith | E04F 13/06 |
| 2017/0254091 | A1 | | 9/2017 | Friel | |
| 2018/0112414 | A1 | | 4/2018 | Maziarz | |
| 2019/0136549 | A1 | | 5/2019 | Maziarz | |
| 2019/0161960 | A1 | | 5/2019 | Baltz, Jr. | |
| 2019/0194954 | A1 | | 6/2019 | Baltz, Jr. | |
| 2019/0292791 | A1 | | 9/2019 | Friel | |
| 2020/0063432 | A1 | * | 2/2020 | Baltz, Jr. | E04B 1/7076 |
| 2020/0063446 | A1 | | 2/2020 | Baltz, Jr. | |
| 2020/0240153 | A1 | * | 7/2020 | Maziarz | E04F 19/061 |
| 2021/0180335 | A1 | | 6/2021 | Maziarz | |
| 2021/0207381 | A1 | * | 7/2021 | Maziarz | E04F 13/06 |
| 2022/0364369 | A1 | * | 11/2022 | Meiswinkel | E04F 13/06 |
| 2023/0061031 | A1 | * | 3/2023 | Hatch | A47B 95/002 |

FOREIGN PATENT DOCUMENTS

| | | | | | |
|---|---|---|---|---|---|
| CA | 2991392 | A1 | * | 7/2018 | E04B 1/6809 |
| CA | 3018274 | A1 | * | 3/2019 | E04F 19/06 |
| DE | 102005039157 | A1 | * | 3/2007 | E04F 13/06 |
| WO | WO-2014023620 | A1 | * | 2/2014 | E04F 13/045 |
| WO | WO-2020081001 | A1 | * | 4/2020 | E04B 2/00 |

* cited by examiner

CASING BEAD APPARATUS

CROSS REFERENCE TO RELATED APPLICATIONS

The present application claims priority of U.S. provisional application Ser. No. 63/202,518, filed Jun. 15, 2021, and U.S. provisional application Ser. No. 63/131,041, filed Dec. 28, 2020, which are hereby incorporated herein by reference in their entireties.

FIELD OF THE INVENTION

The present invention relates to casing beads. Specifically, the present invention relates to a stop system used at a terminal edge of a stucco or plaster surface, such as an adjoining frame for a window or door or an upper edge region of a wall or at the junction of plaster and another material.

BACKGROUND OF THE INVENTION

Stucco and/or plaster are typically used for both interior and exterior surfaces in home or commercial building construction. Stucco or plaster is routinely applied to a galvanized wire mesh over felt paper which has been attached to underlying plywood or other sheathing material (FIG. 1). In order to provide a smooth edge where the stucco or plaster meets a door or window jamb or frame, plastic stop strips are installed along the desired edge of the stucco or plaster to contain it and provide for an even finish.

The plastic stop often used for this purpose is presented in FIG. 2. The plaster stop generally consists of a perforated plastic strip approximately 2 inches wide with a plastic lip or edge acting to contain the stucco or plaster away from the jamb or frame. The plaster stop is typically installed approximately W inch away from the jamb or frame, leaving a gap between the stop and the backing surface. In order to provide a complete finish, the worker must install a backer rod into the gap and then apply a finishing layer of caulk. This process that is used by some builders to prevent leaks is very time consuming.

This method of stucco installation has often resulted in leaking problems between the stucco or plaster surface and the adjacent jamb, thereby causing significant additional repair costs and frustration to both home owners and construction companies. In addition, the extra time and materials necessary for installation of the backer rod and finishing caulk layer can add considerably to the costs and duration of the construction. The L-Bead (FIGS. 3, 5, 6 and 7) represented an advancement in the art by eliminating the need for installation of a backer rod-saving considerable time and money- and cutting down on the potential for leaks around windows and doors.

The present invention continue advancements in the art and provides a self-adhering casing bead that is easier to install, does not require backer rod or caulking, provides for quick, efficient and lower cost installation of stucco and/or plaster and cuts down on the potential for leaks around windows and doors.

SUMMARY OF THE INVENTION

The present invention, provides a system for quick, efficient and lower cost installation of stucco and or plaster which cuts down on the potential for leaks around windows and doors. A self-adhering casing bead may be used as a stop between the edge of the stucco or plaster surface and the adjacent jamb or window/door frame. A flexible area of the casing bead helps to seal the surface and acts as a gasket to prevent water intrusion. The distance is also greatly reduced because caulking is not required.

According to one aspect of the present invention, a self-adhering casing bead apparatus is provided comprising: a base panel having a front face, a rear face and at least one opening; a stop bead wall having a top and a bottom, the bottom formed on the base panel and the stop bead wall extending above the front face of the base panel, the stop bead wall having a first side, a second side and a flange extending from the top; a spacing member having a left side, a left leg in communication with the left side, a convex bottom, a right side and a right leg in communication with the right side, wherein the left side is offset from the flange, wherein the left leg and the right leg are in communication with the second side of the stop bead wall; and at least one adhesive strip in communication with the spacing member.

According to another aspect of the present invention, a self-adhering casing bead apparatus is provided comprising: a base panel having a front face, a rear face, a first row of openings, a second row of openings and a third row of openings; a stop bead wall having a top and a bottom, the bottom formed on the base panel and the stop bead wall extending above the front face of the base panel, the stop bead wall having a first side, a second side and a flange extending from the top; a spacing member having a left side, a left leg in communication with the left side, a convex bottom, a right side and a right leg in communication with the right side, wherein the left side is offset from the flange, wherein the left leg and the right leg are in communication with the second side of the stop bead wall; and at least one adhesive strip in communication the spacing member.

According to another aspect of the present disclosure, a casing bead apparatus configured for mounting at a vertical wall structure includes an attachment flange. The attachment flange includes a first side and a second side opposite the first side. With the casing bead apparatus mounted at a vertical wall structure, the second side of the attachment flange is disposed at a backing wall of the vertical wall structure. A bead wall extends from the first side of the attachment flange substantially perpendicular to the attachment flange. The bead wall includes a ventilation flange at a distal end of the bead wall distal from the attachment flange. A stop bead wall extends from the ventilation flange along the bead wall and spaced from the bead wall. A terminal end of the stop bead wall distal from the ventilation flange is spaced from the attachment flange. At least one ventilation opening is formed through the stop bead wall.

The lip on the edge of the plaster stop acts to contain the plaster or stucco and keep it away from the door or window jamb.

Figure 3:
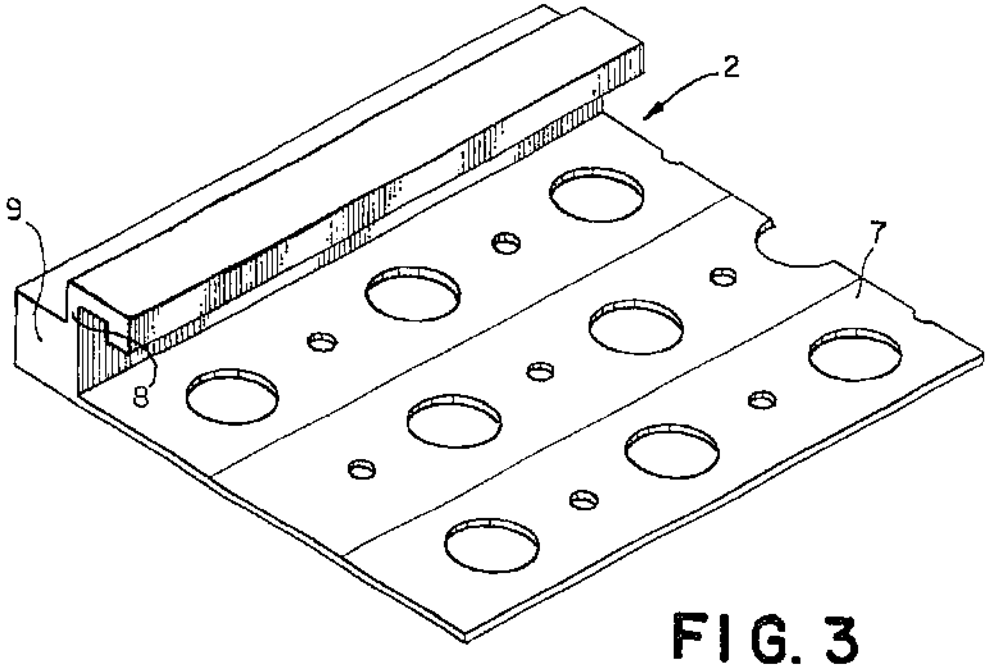
FIG. 3 PRIOR ART

FIG. 3 shows the L-Bead (as in U.S. Pat. No. 9,279,247). As with traditional plaster stop, the perforated portion is nailed or otherwise attached to the backing wall. The higher lip part of the stop contains the stucco or plaster. The added backing lip of the L-Bead abuts directly to the jamb and eliminates the need for a backer rod, thereby cutting down on both leaks and installation time.

Figure 2:
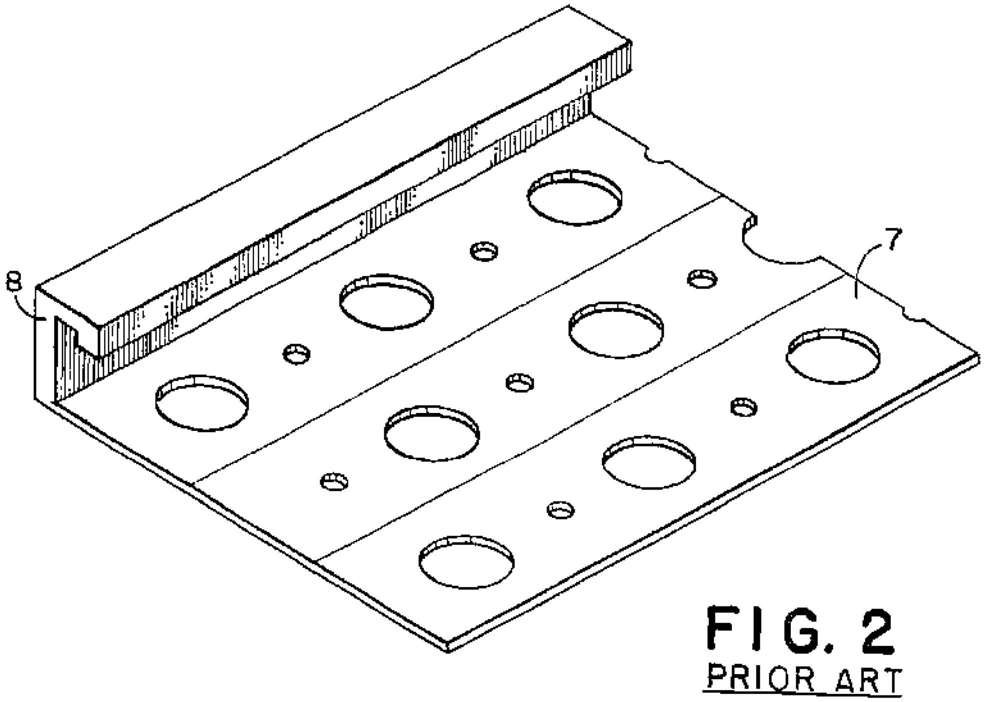
FIG. 2 PRIOR ART
FIG. 2 is a drawing showing an enlarged view of existing plaster stop. The perforated portion of the plaster stop is nailed or otherwise attached to the backing wall.
Figure 4:
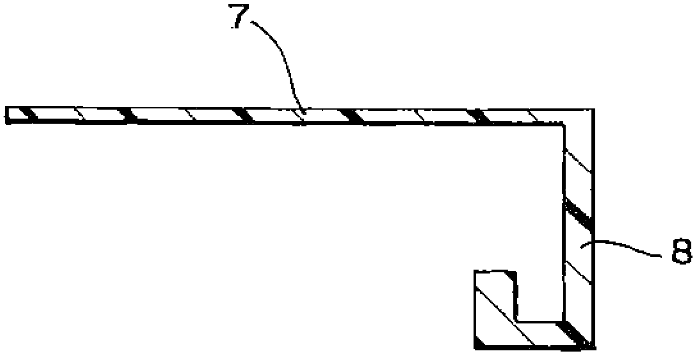
FIG. 4 PRIOR ART

FIG. 4 is a view in cross-section of the prior art stop or stop bead shown in FIG. 2.

Figure 5:
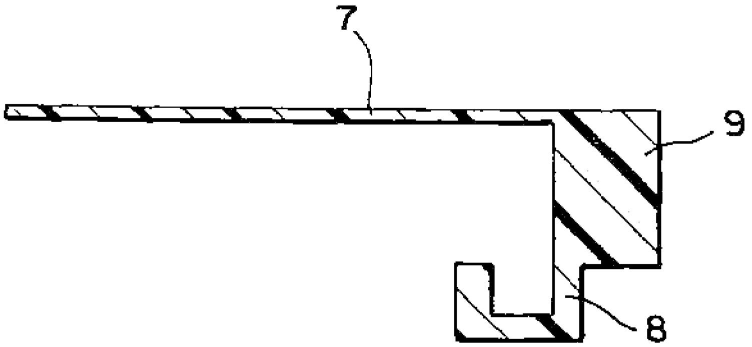
FIG. 5 PRIOR ART

FIG. 5 is a view in cross-section of the stop or stop bead 2 shown in FIG. 3.

Figure 6:
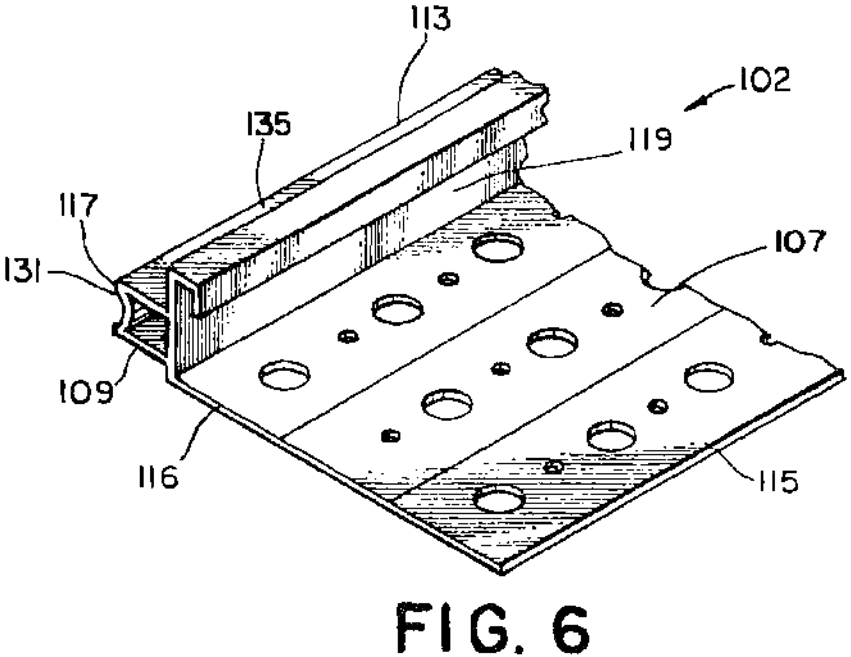
FIG. 6 PRIOR ART

FIG. 6 is a view in perspective showing an alternative embodiment of the stop bead.

Figure 7:
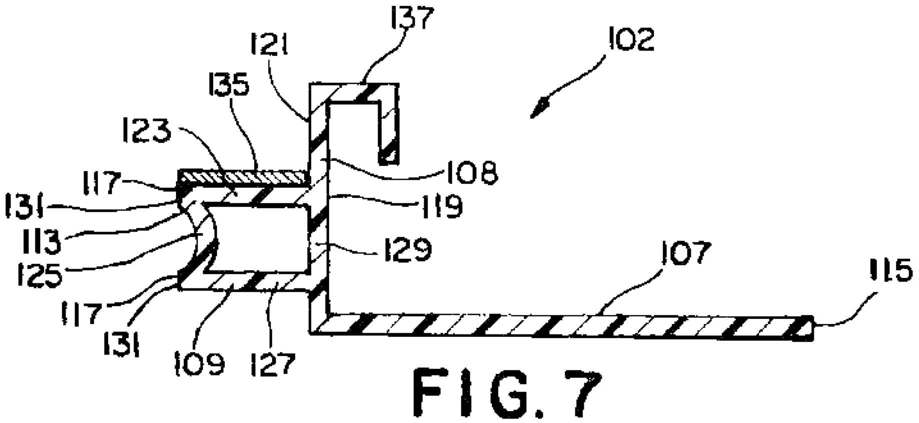
FIG. 7 PRIOR ART

FIG. 7 is a view in cross-section of the stop bead shown in FIG. 6.

Figure 8:
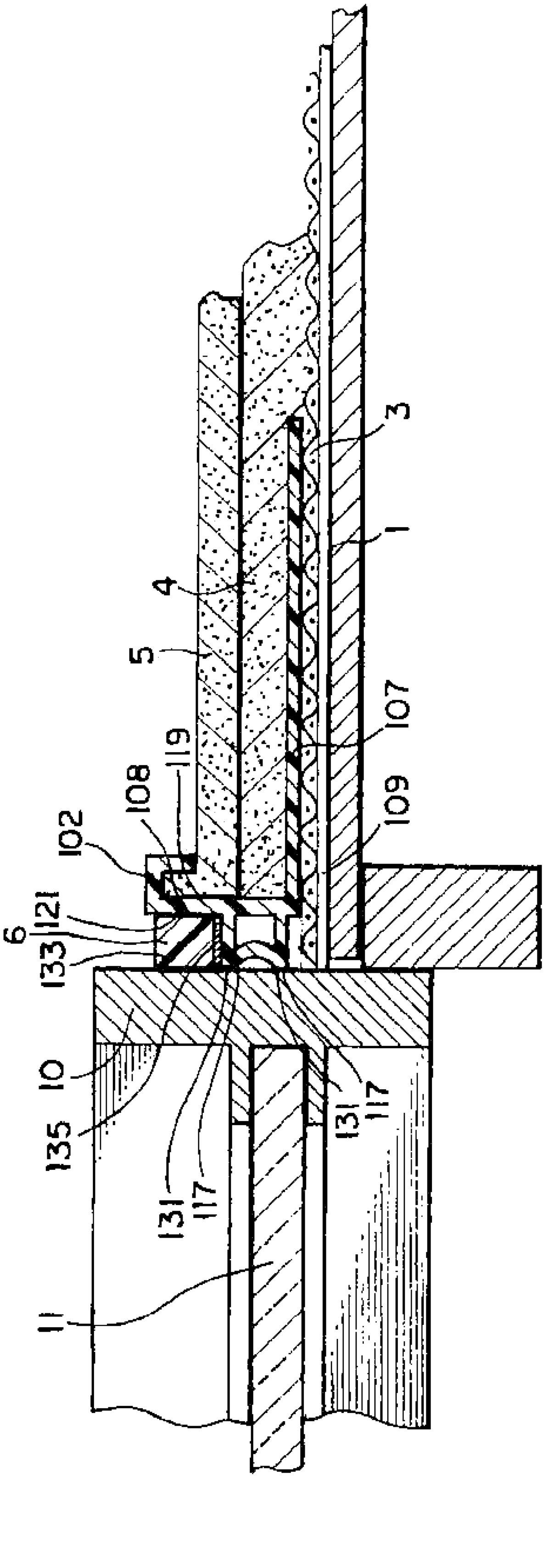
FIG. 8 PRIOR ART

FIG. 8 is a view in cross-section showing the alternative embodiment of the stop bead of FIG. 6 installed in a wall.

Figure 9:
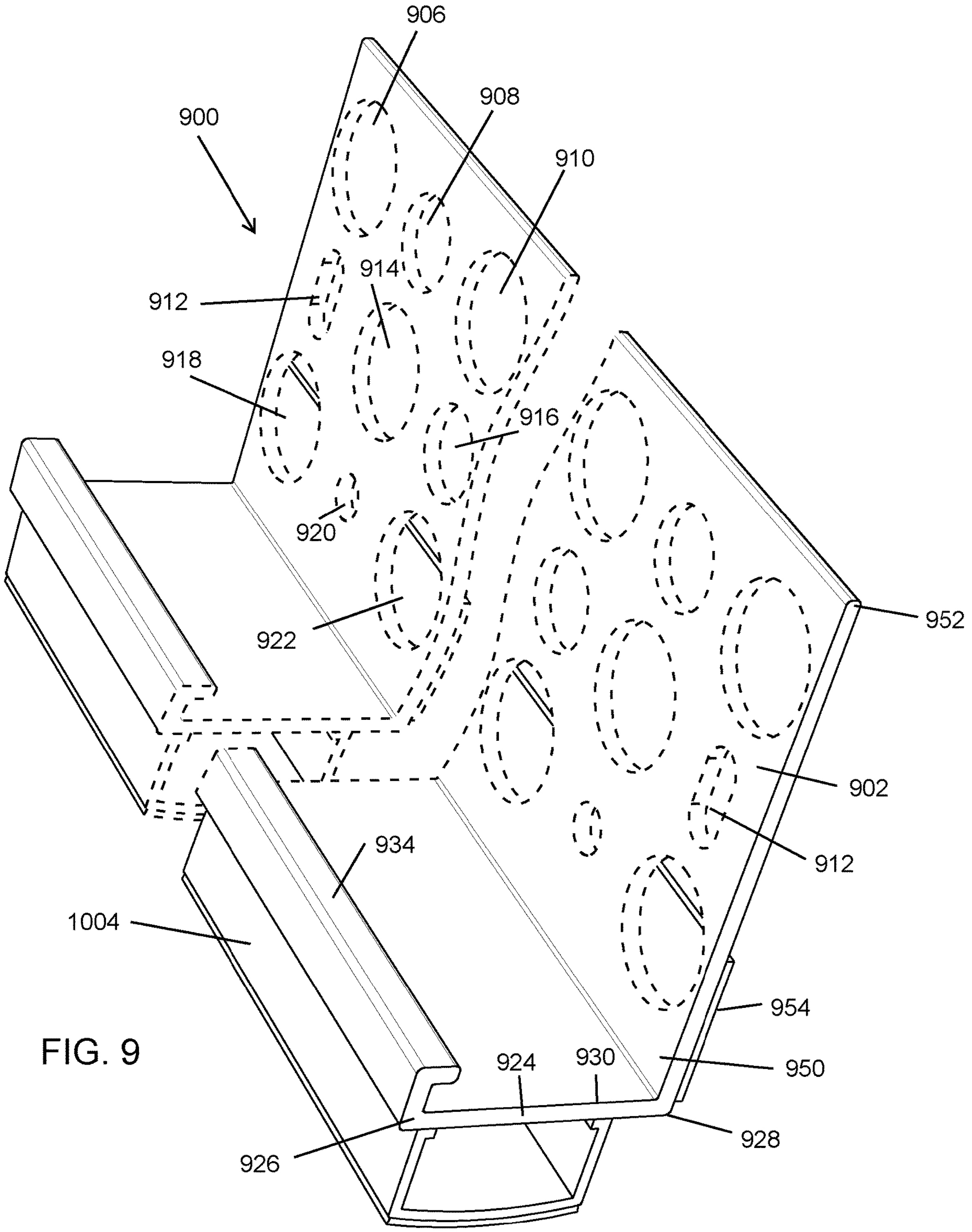
Figure 10:
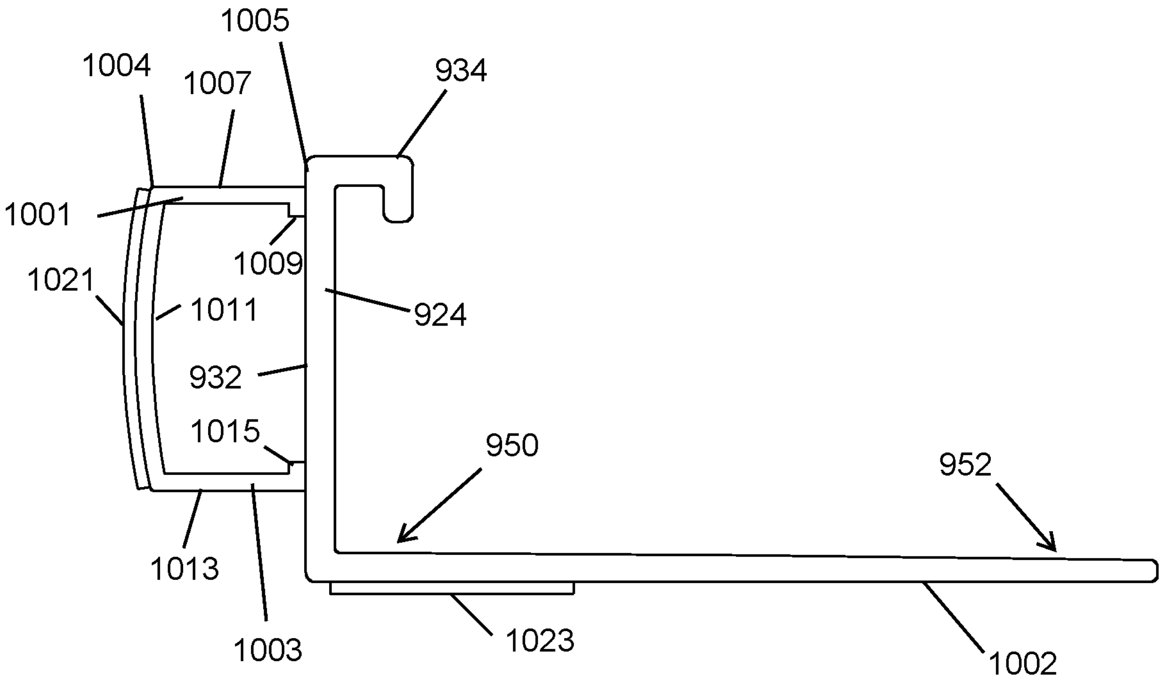
Figure 11:
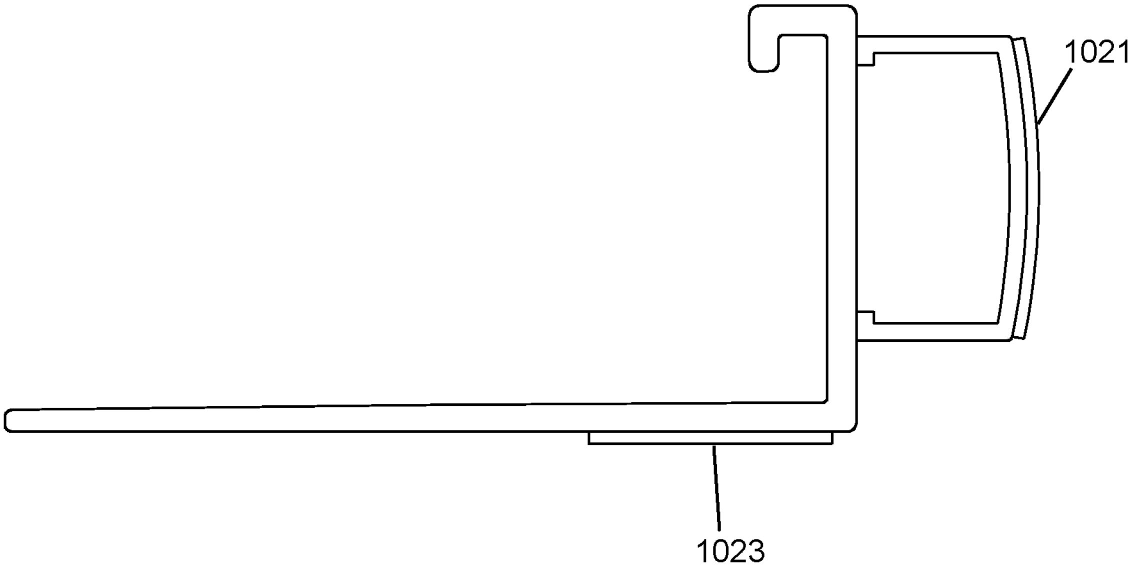
Figure 12:
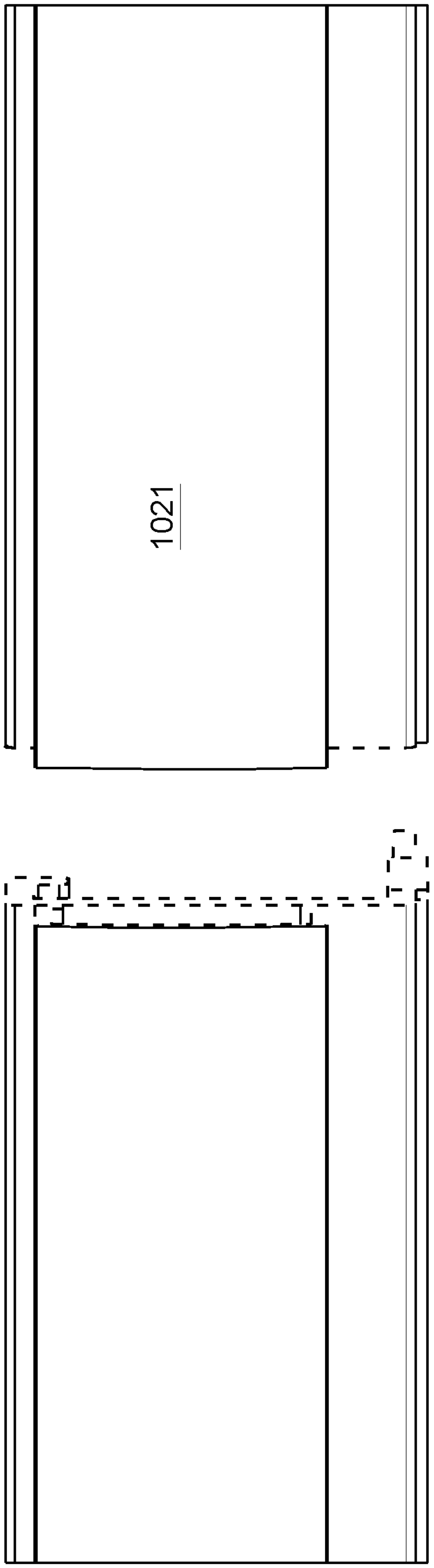
Figure 13:
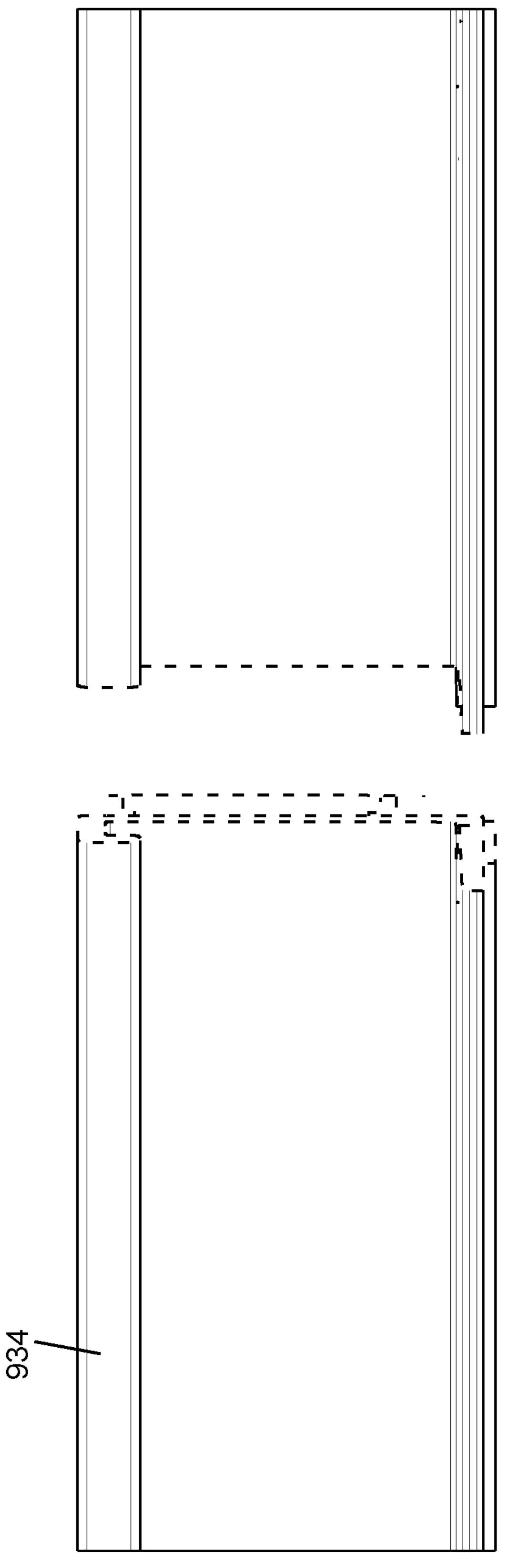
Figure 14:
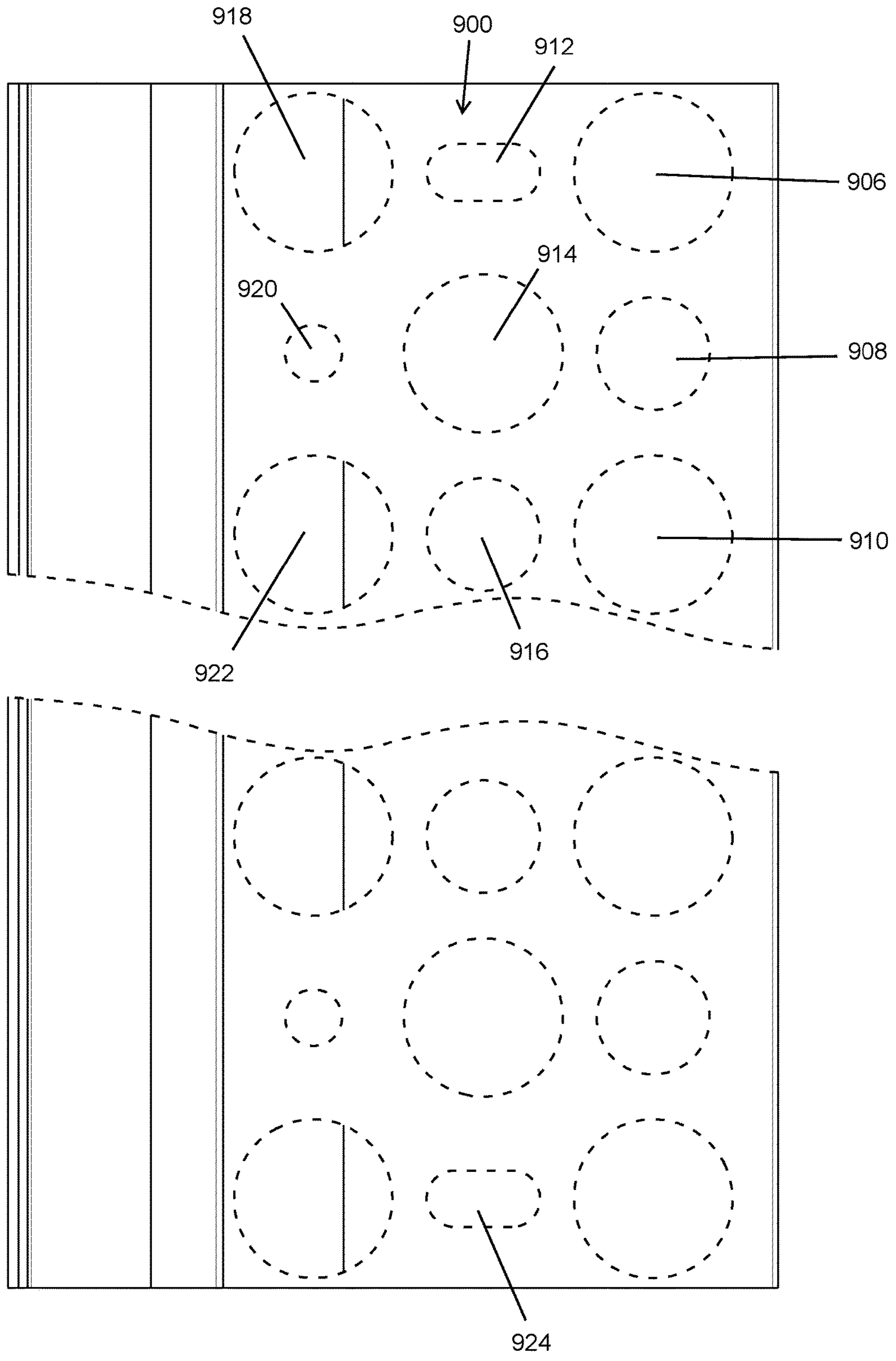
Figure 15:
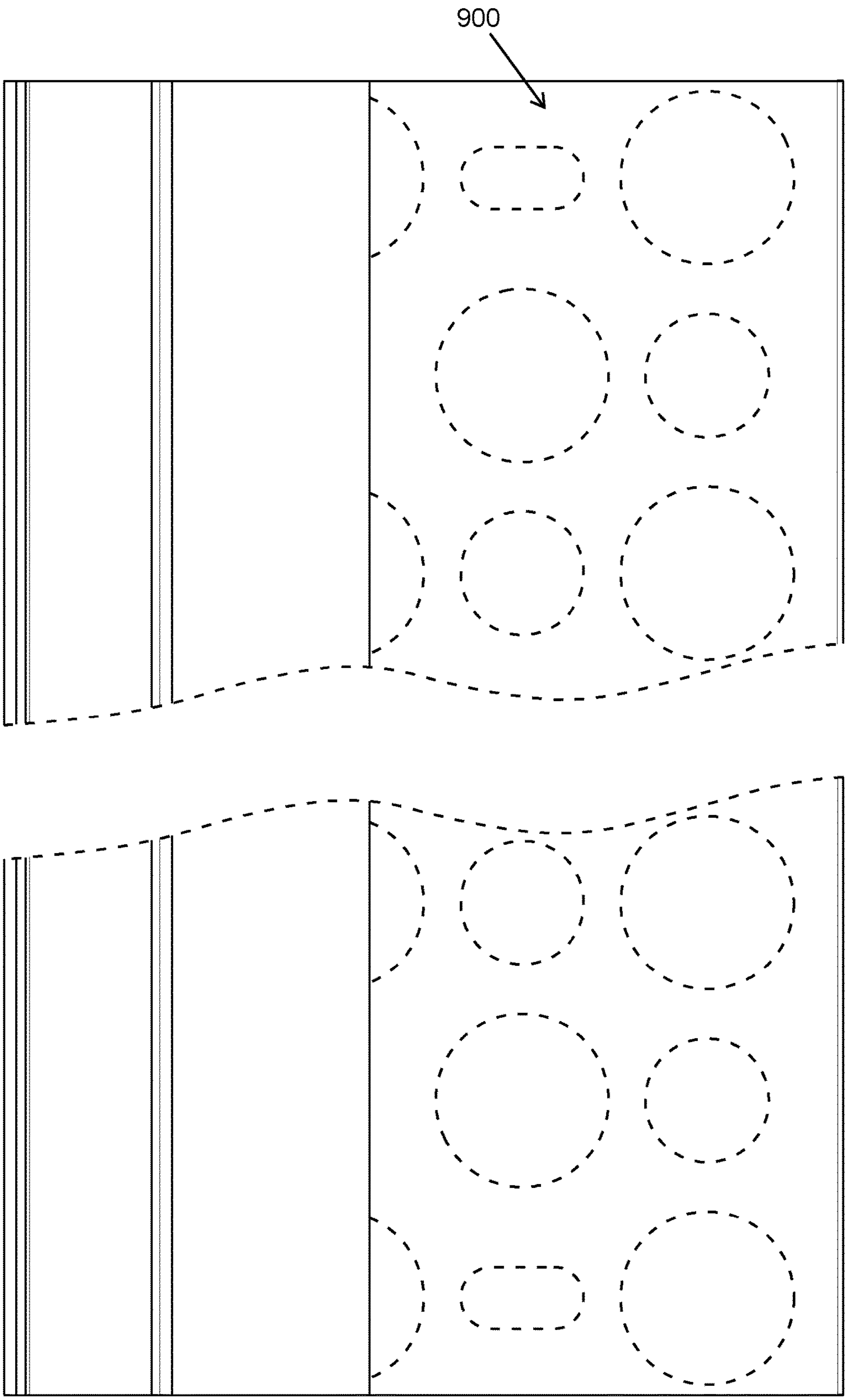

FIG. 9 is an elevation view of the front of the self-adhering casing bead;

FIG. 10 is a side view of the self-adhering casing bead of FIG. 9;

FIG. 11 is a side view of the self-adhering casing bead of FIG. 9;

FIG. 12 is a bottom view of the self-adhering casing bead of FIG. 9;

FIG. 13 is a top view of the self-adhering casing bead of FIG. 9;

FIG. 14 is a back side view of the self-adhering casing bead of FIG. 9; and FIG. 15 is a front side view of the self-adhering casing bead of FIG. 9.

Figure 16:
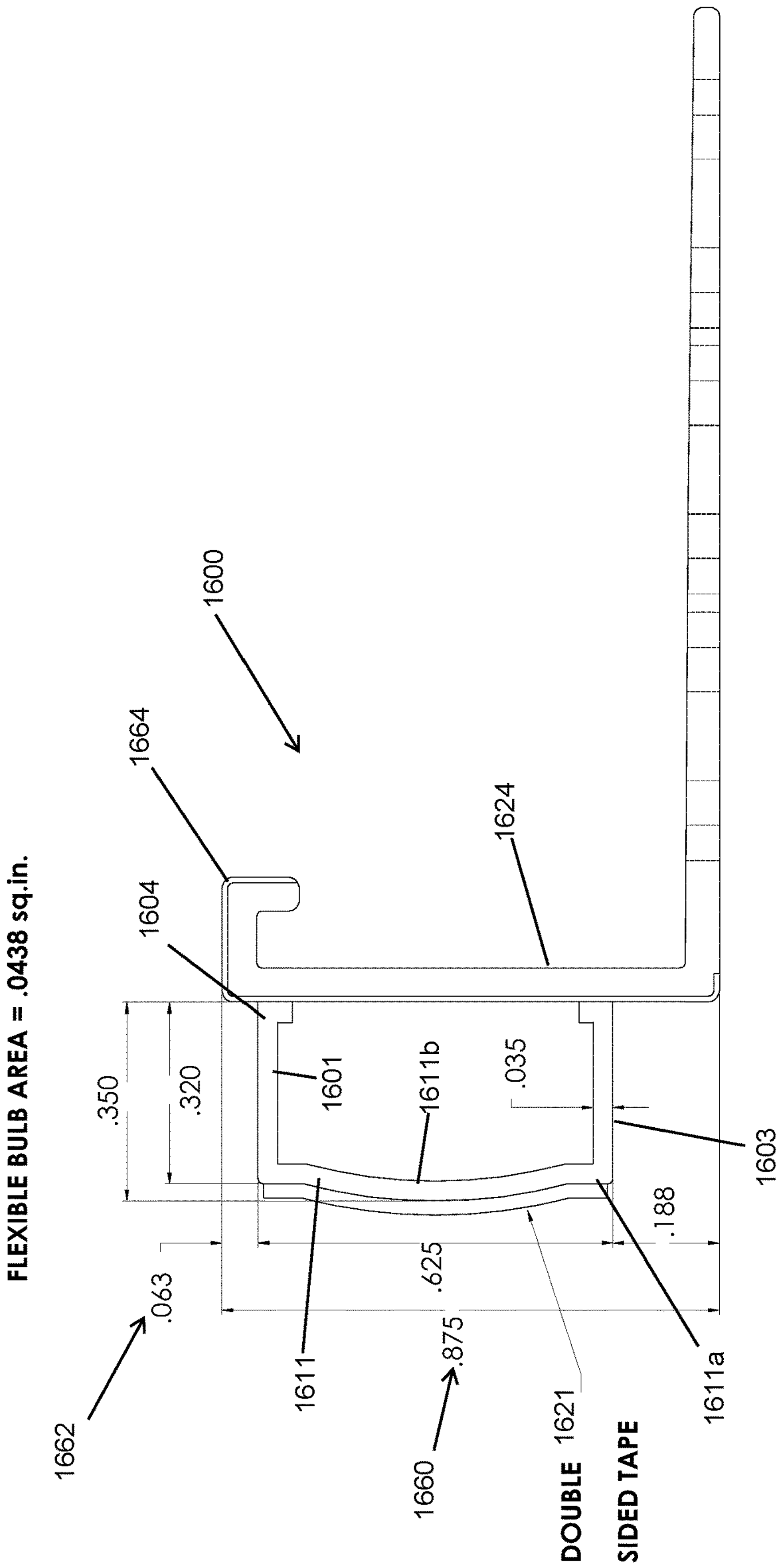
Figure 17:
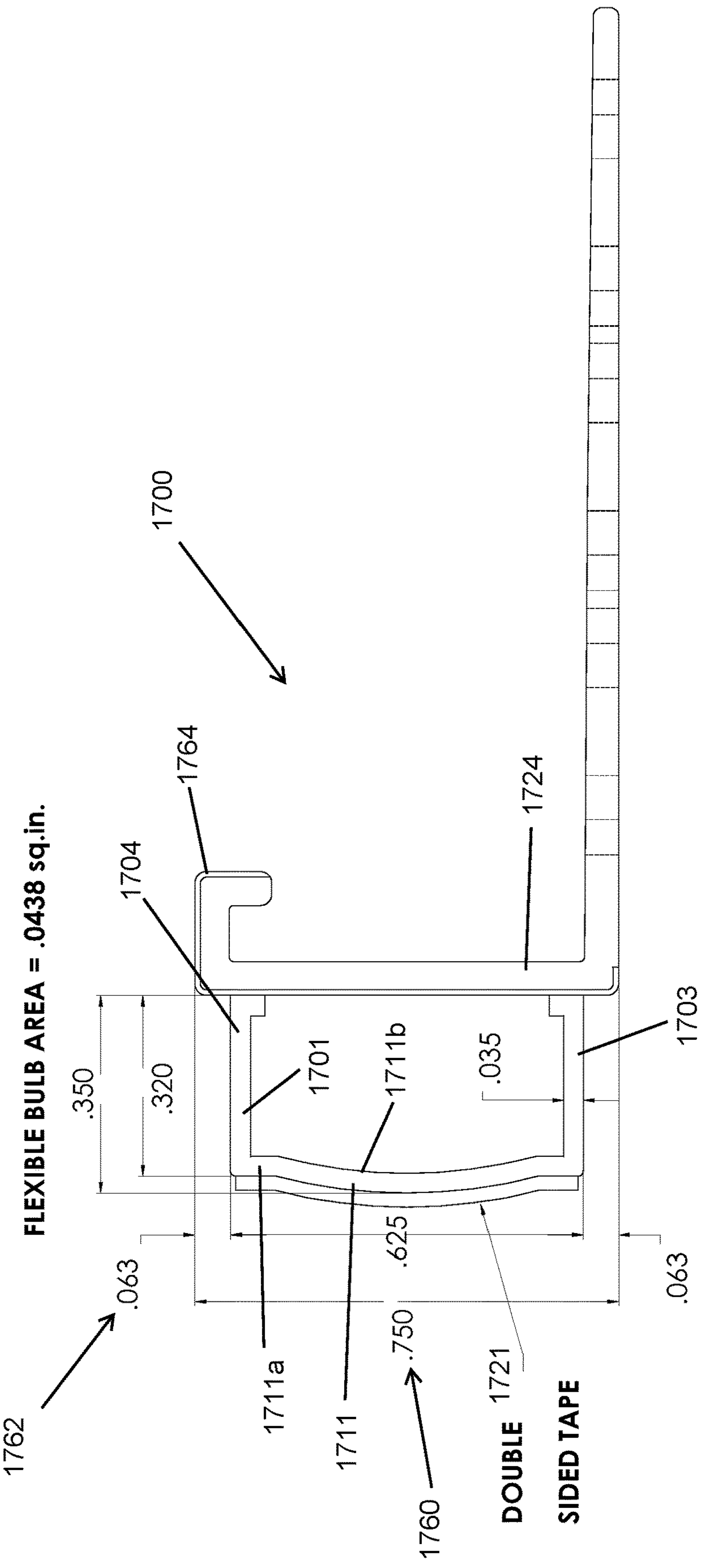
Figure 18:
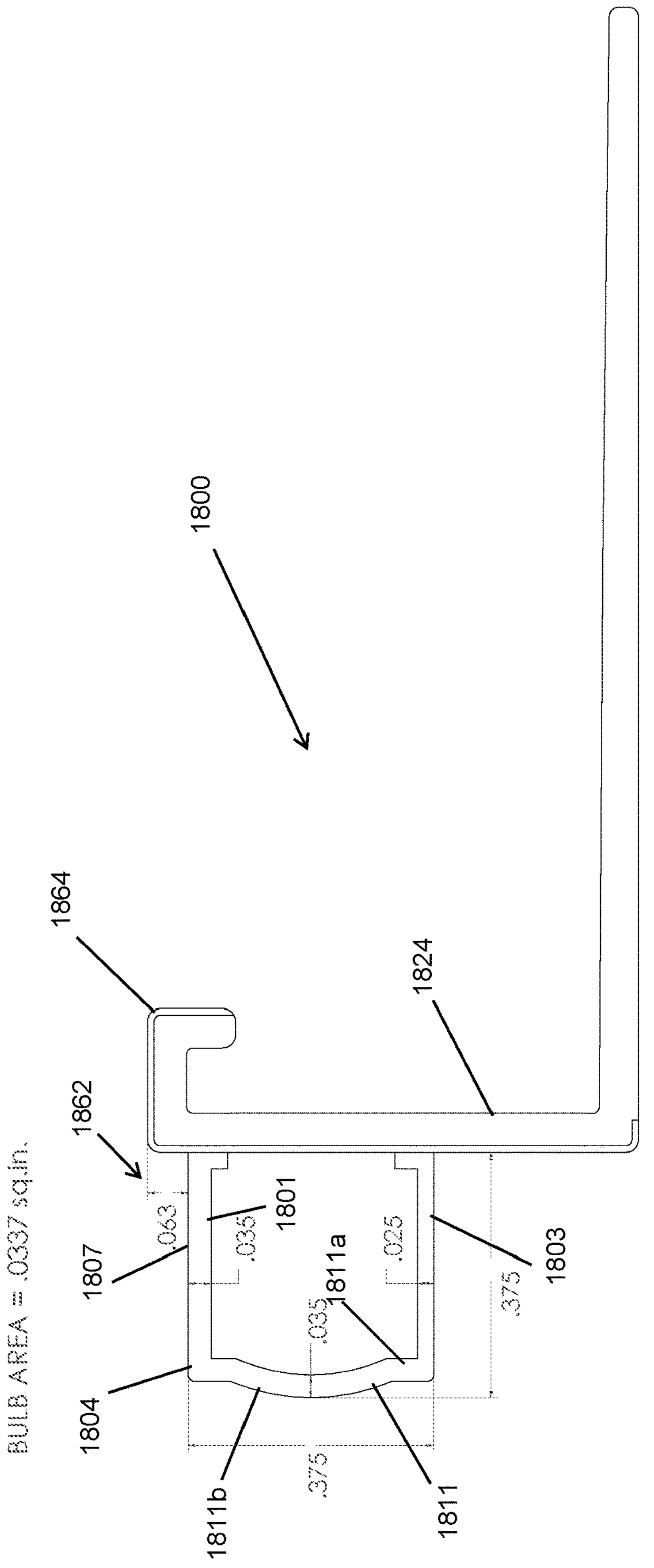
Figure 19:
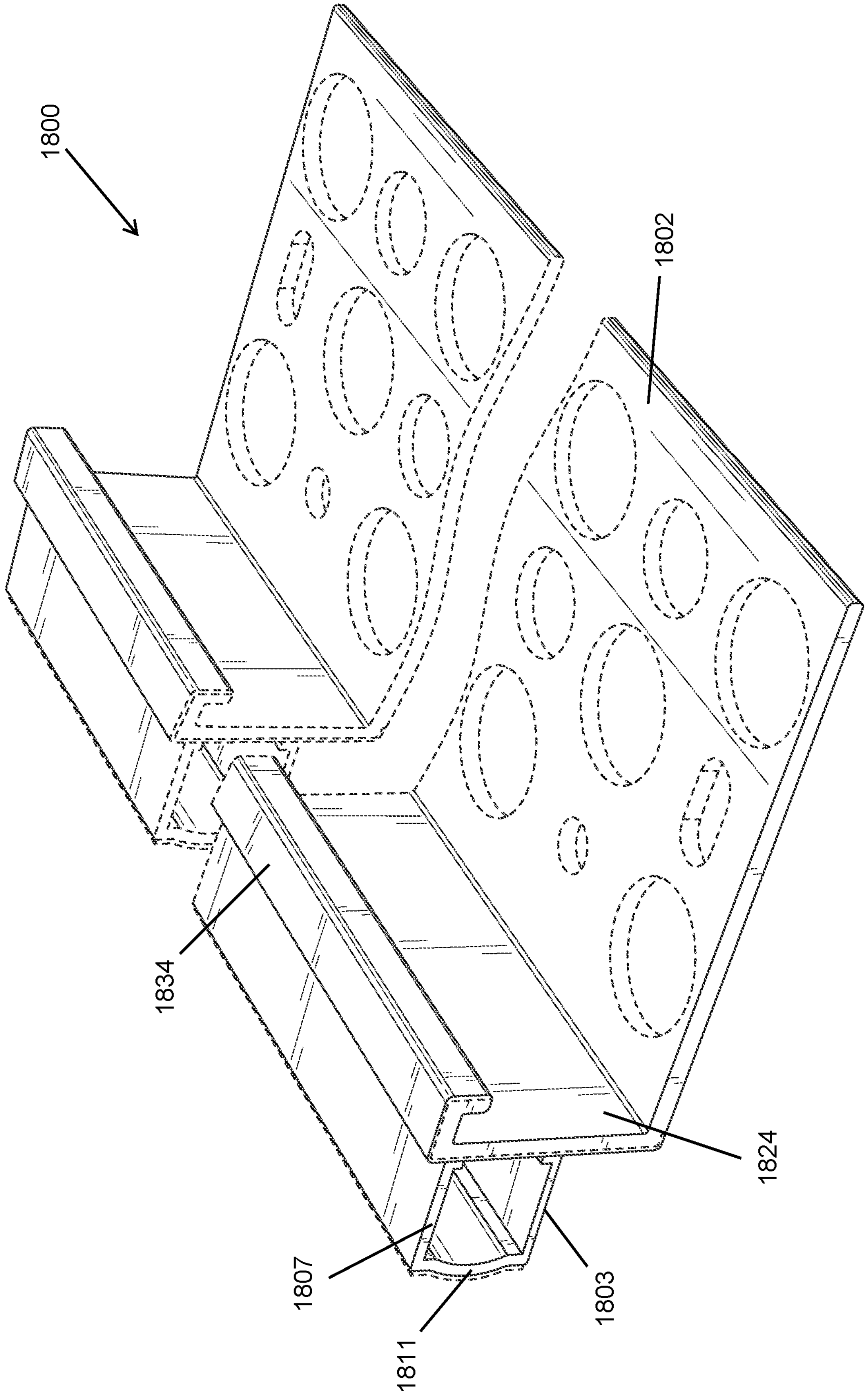
Figure 20:
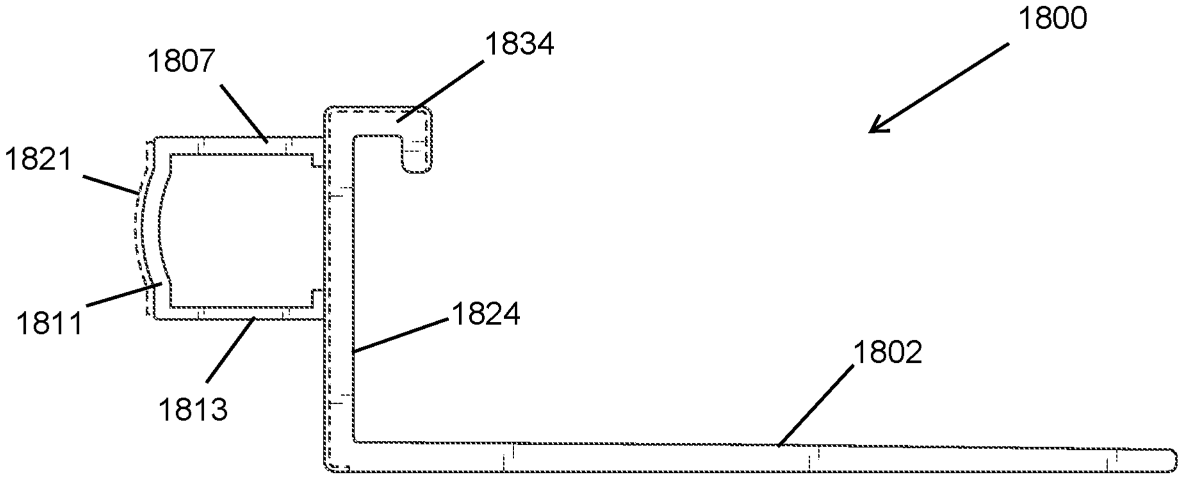
Figure 21:
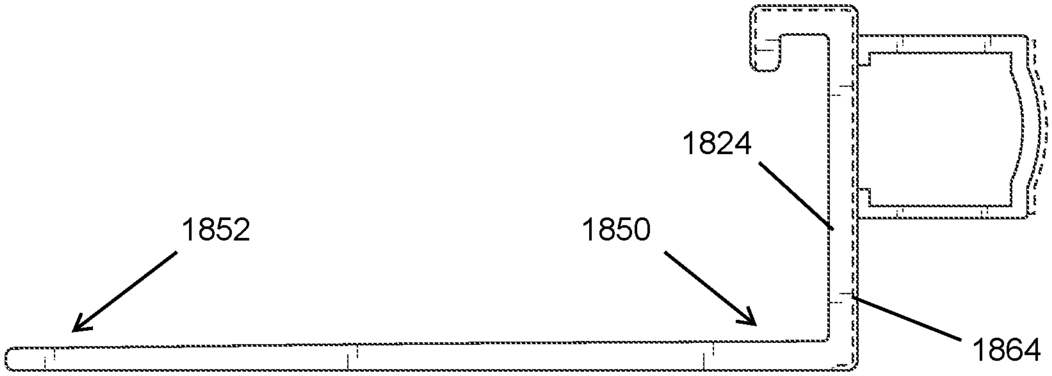
Figure 22:
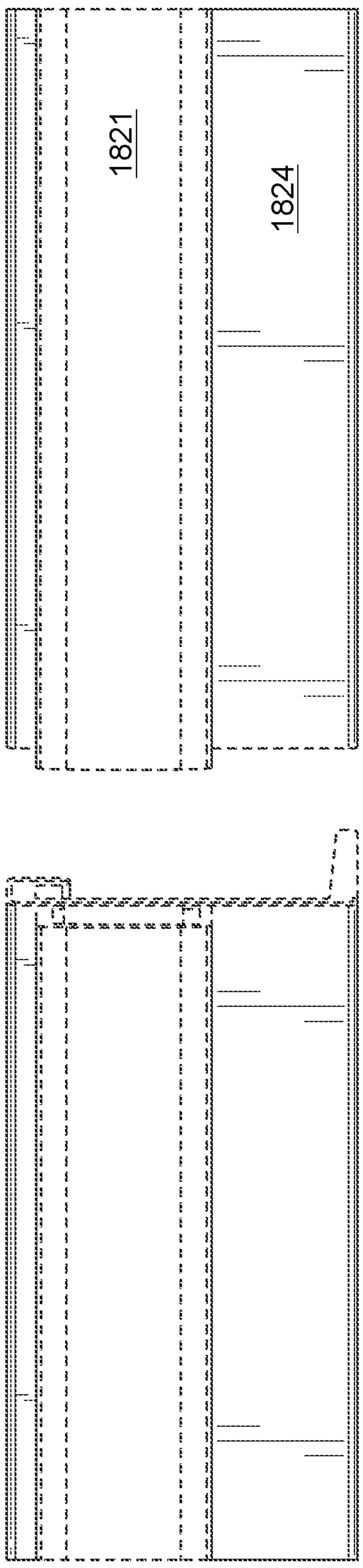
Figure 23:
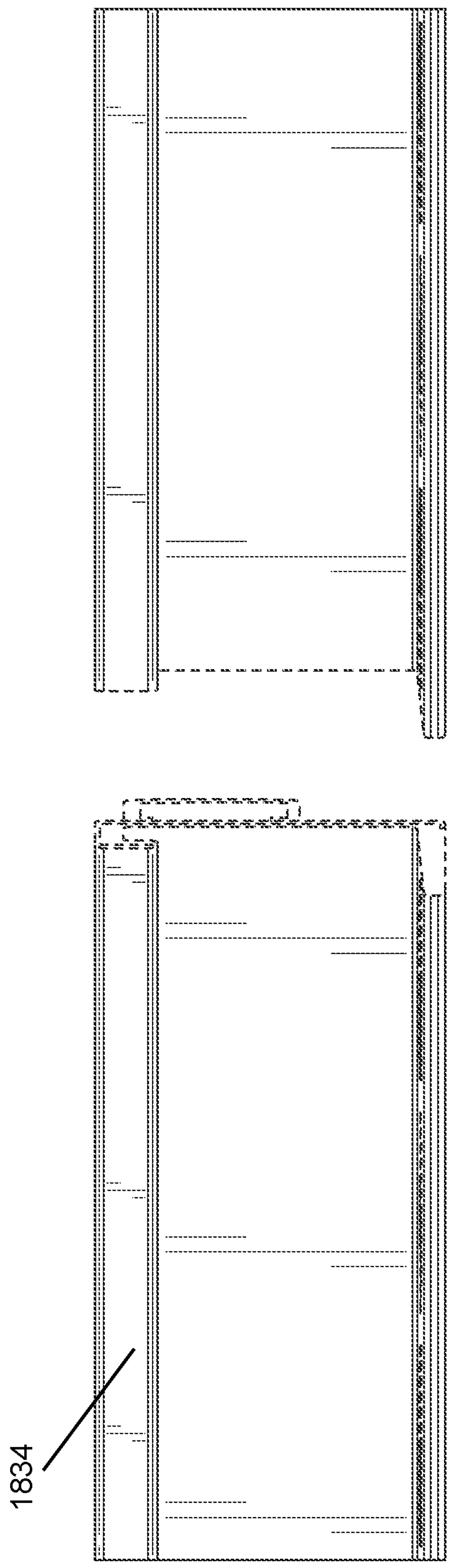
Figure 24:
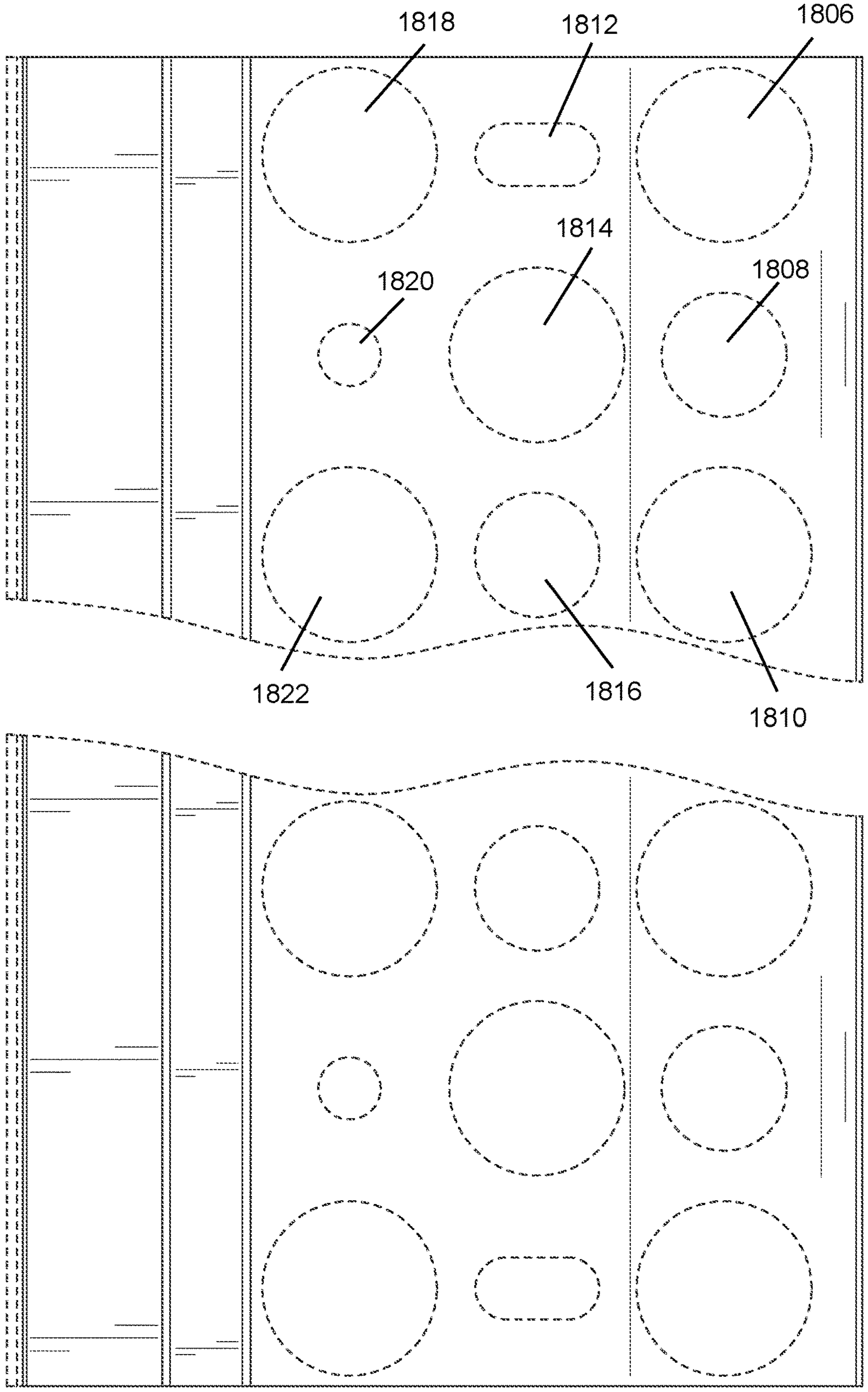
Figure 25:
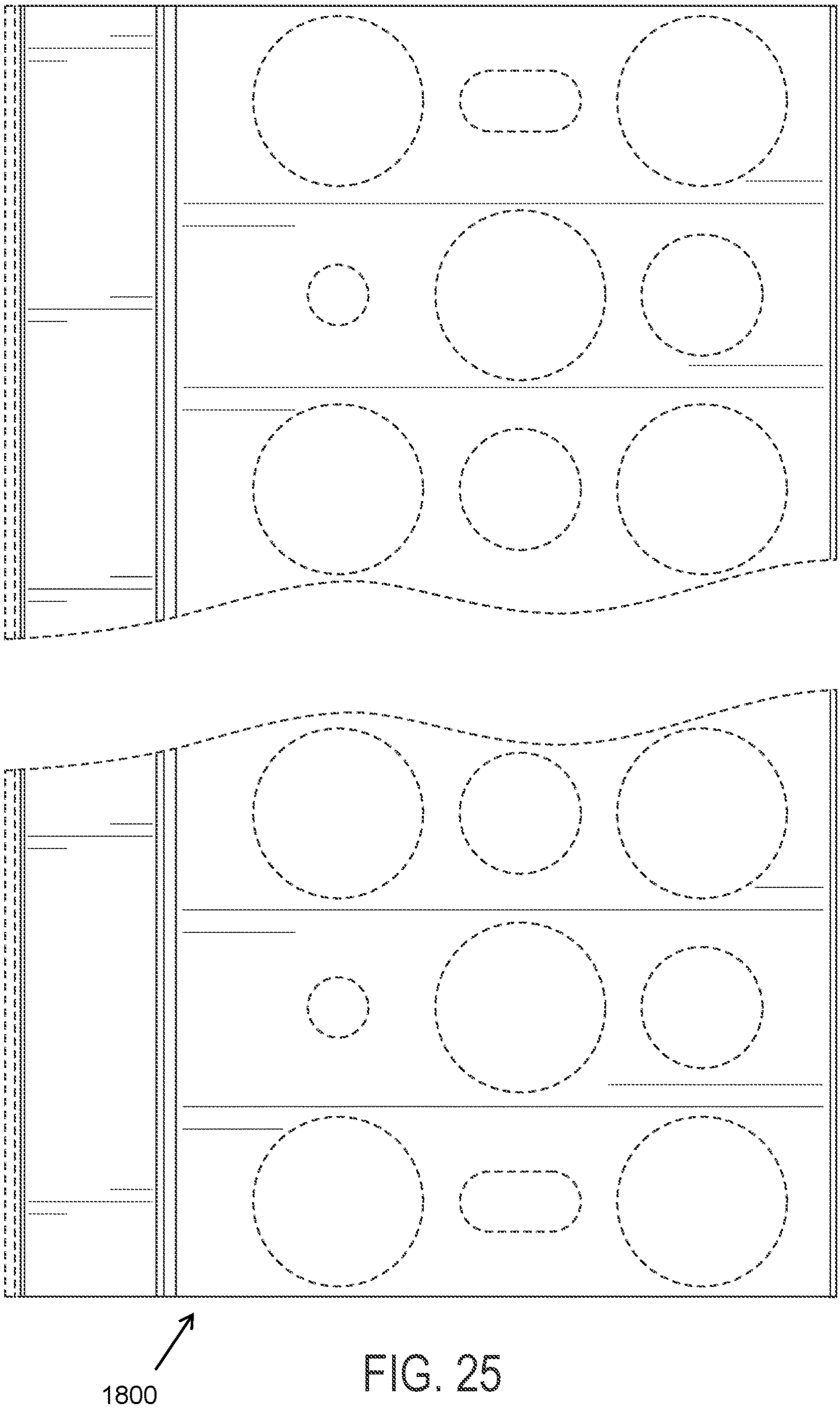
Figure 26:
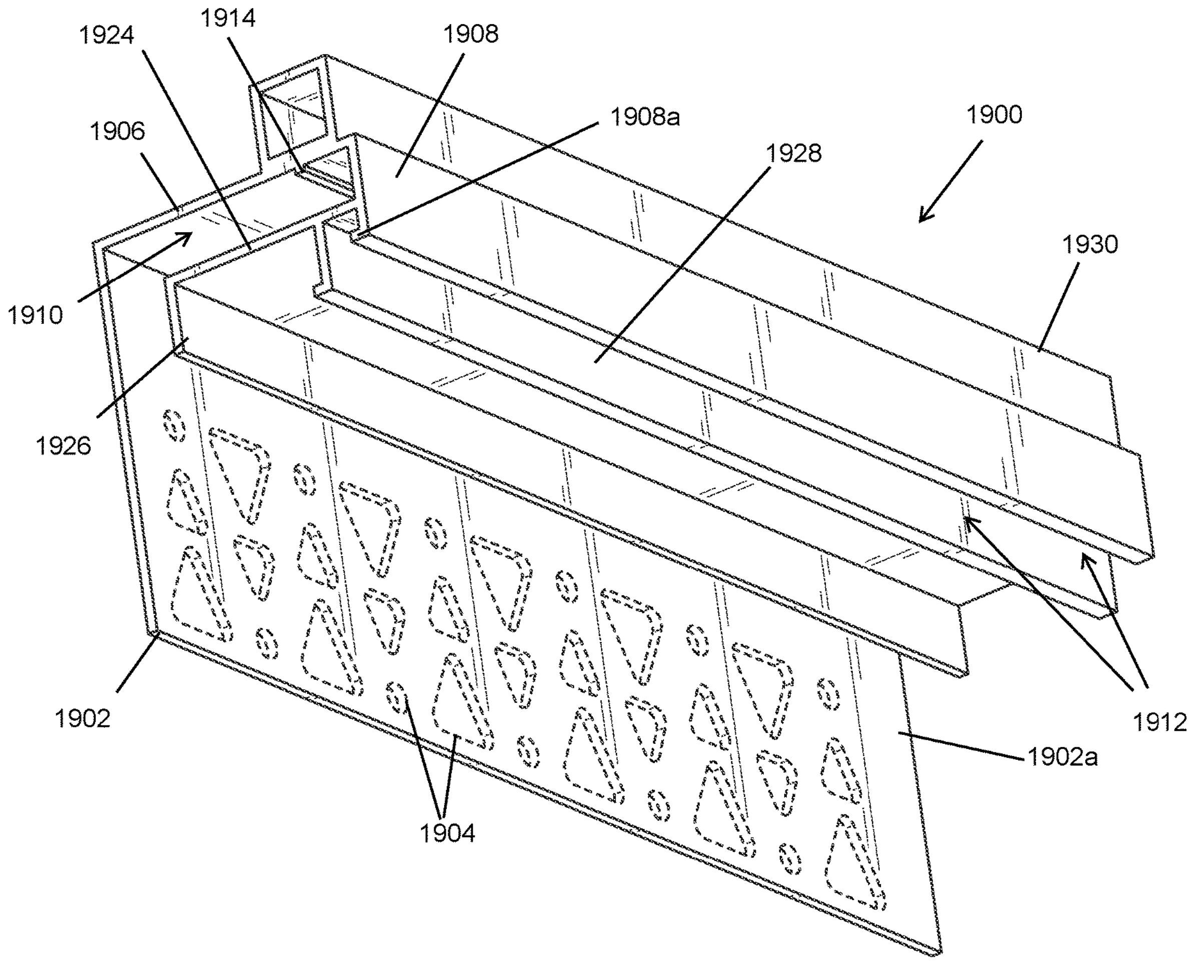
Figure 27:
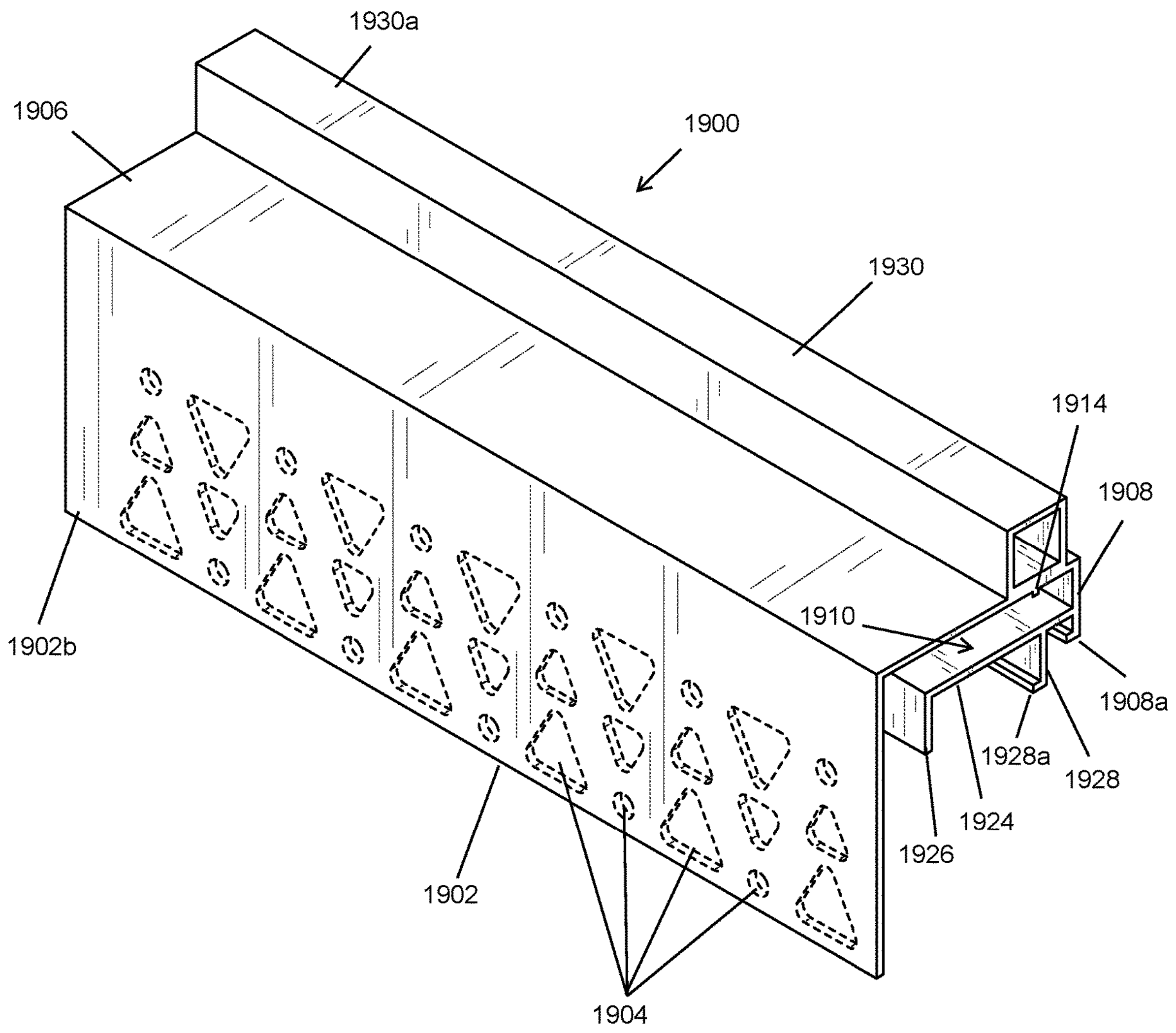
Figure 28C:
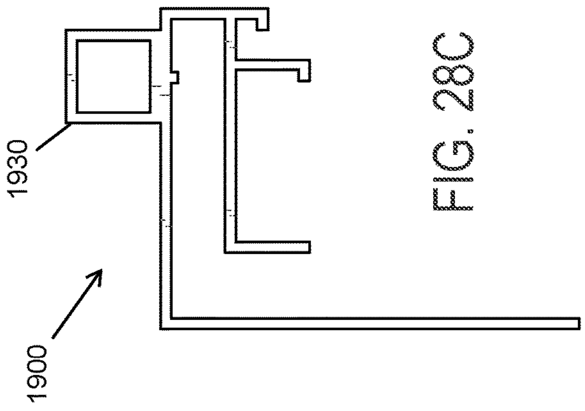
Figure 28A:
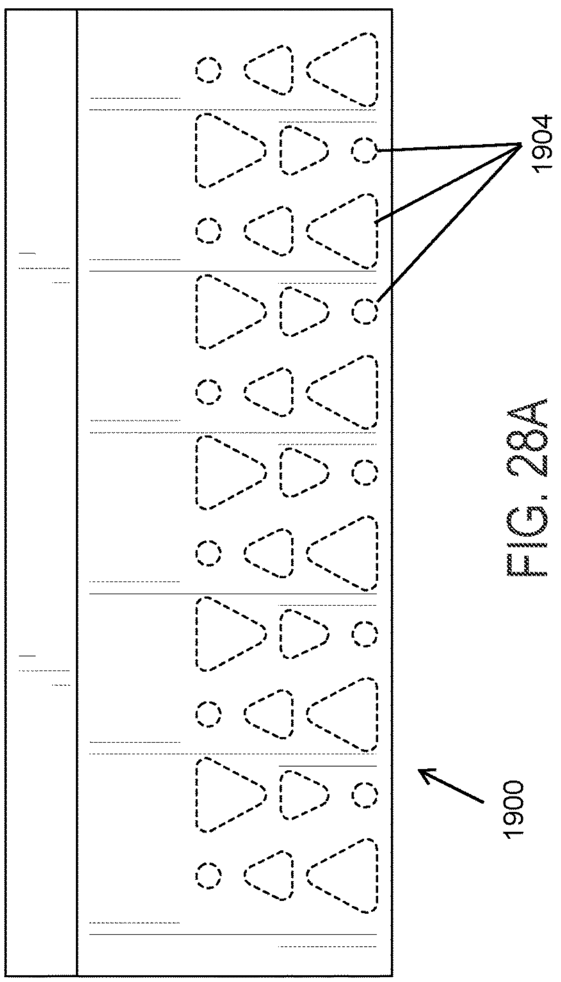
Figure 28B:
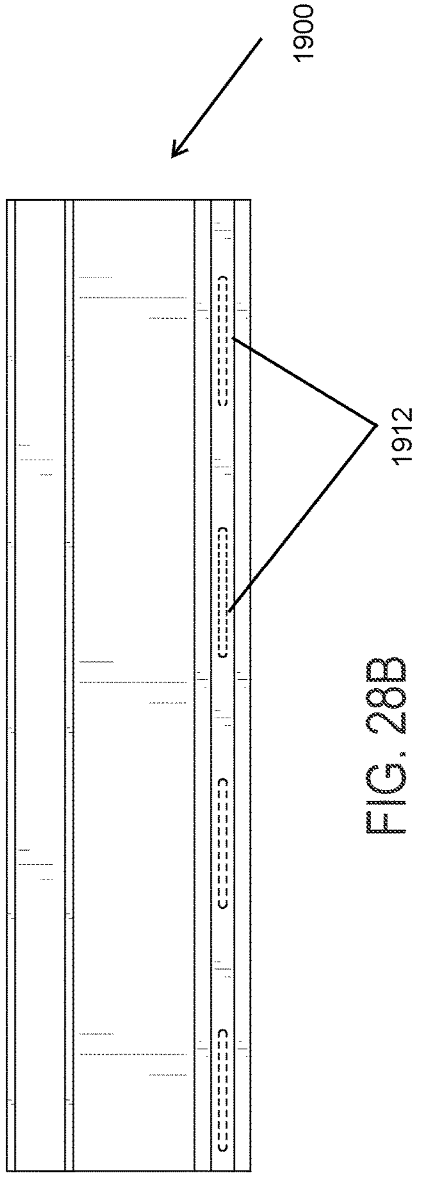
Figure 28F:
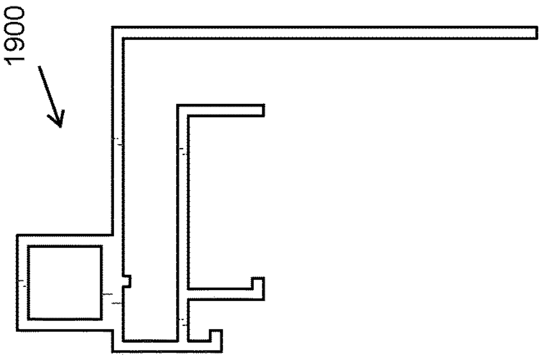
Figure 28D:
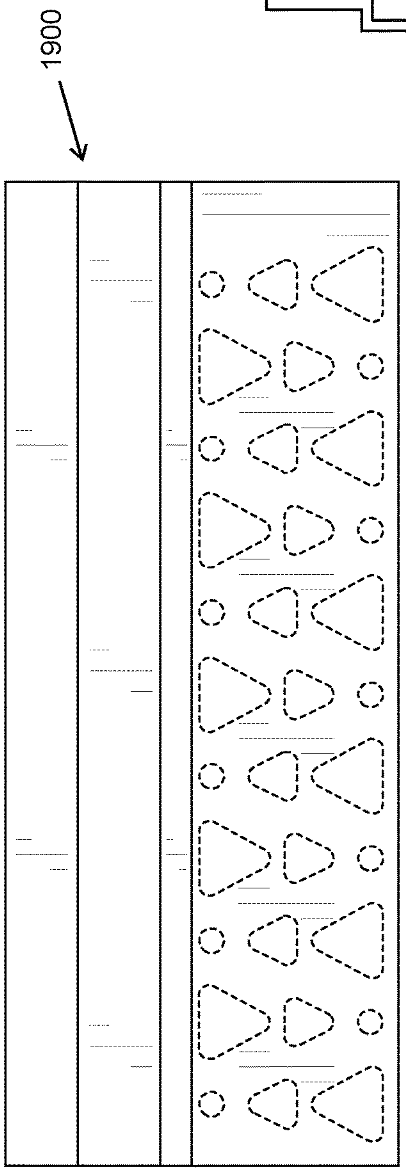
Figure 28E:
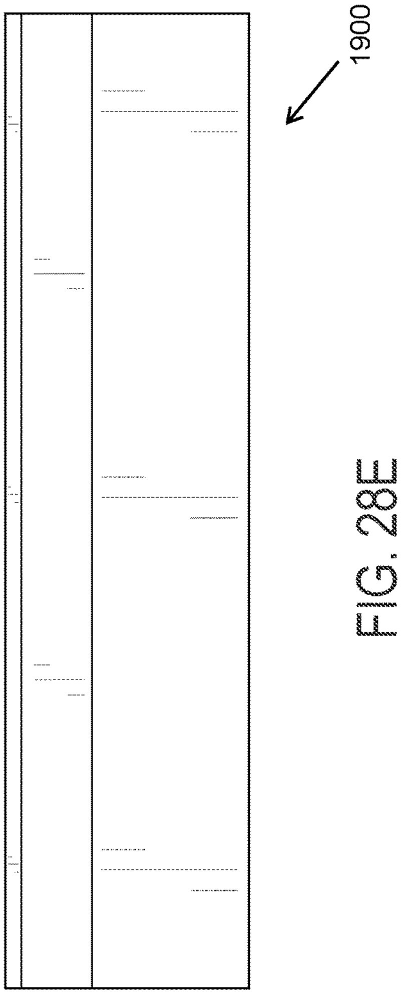
Figure 29A:
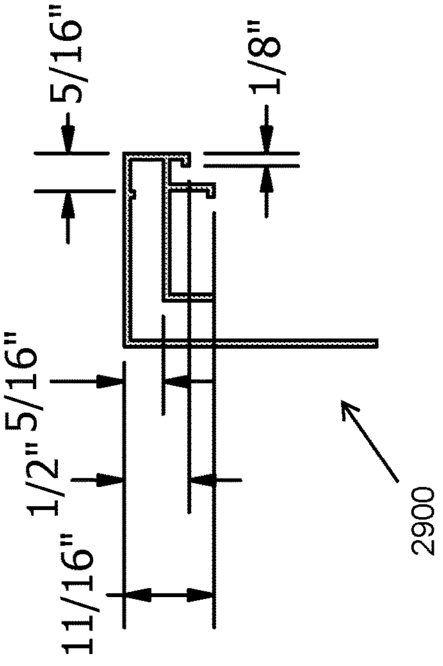
Figure 29B:
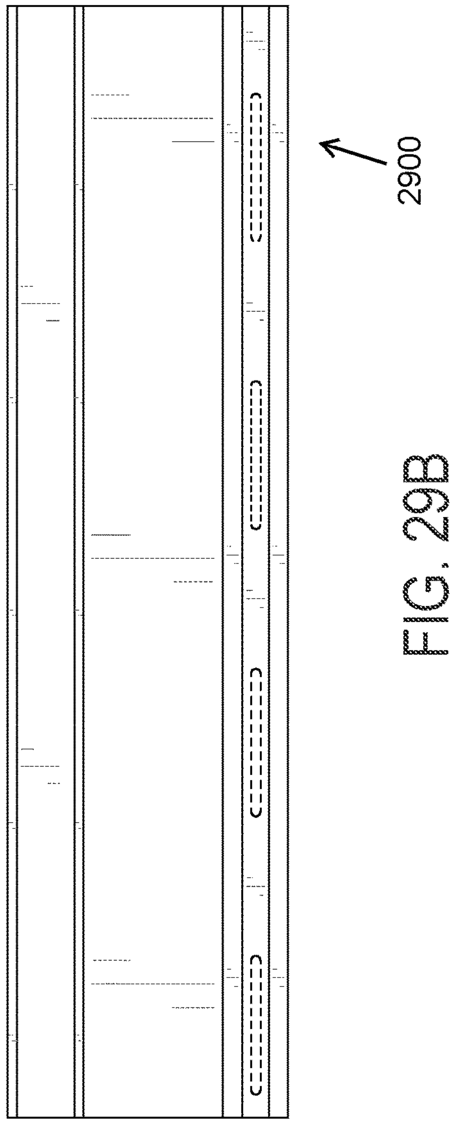
Figure 30C:
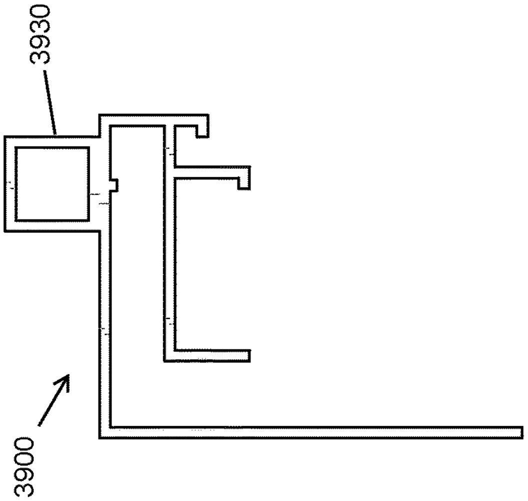
Figure 30A:
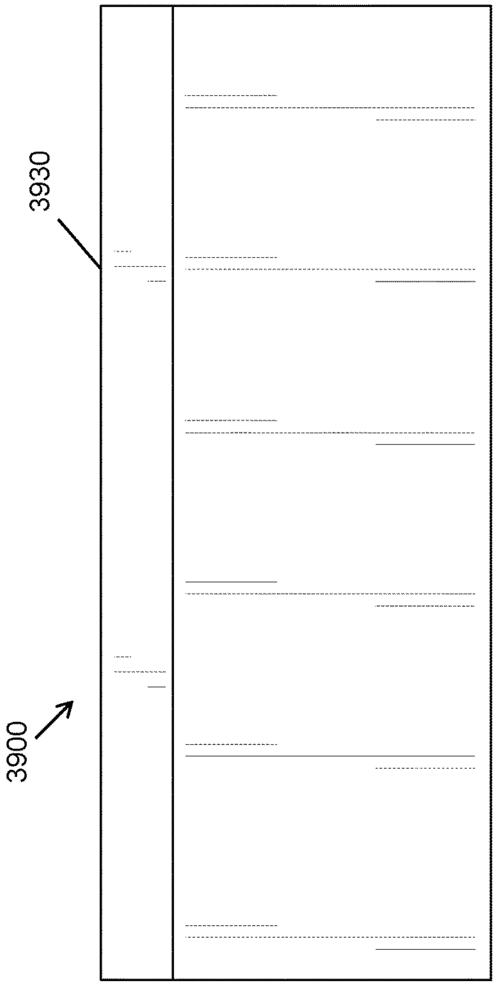
Figure 30B:
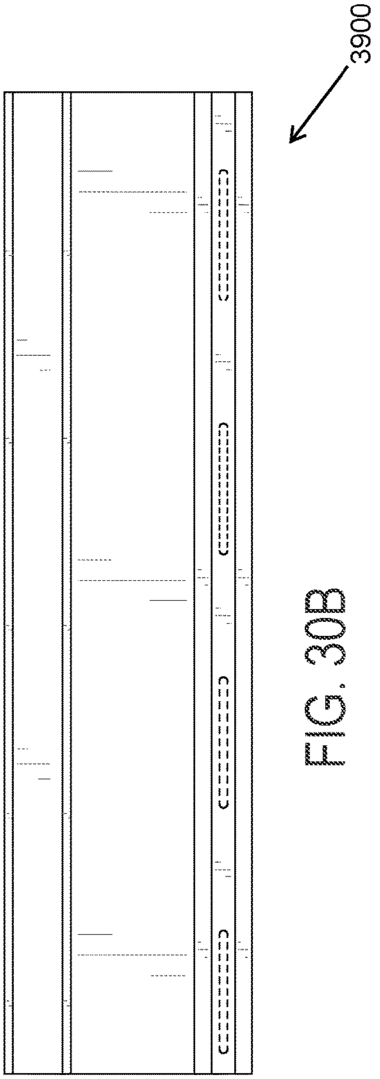
Figure 31A:
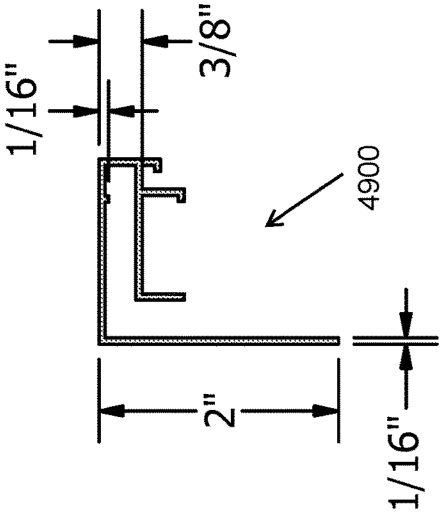
Figure 31B:
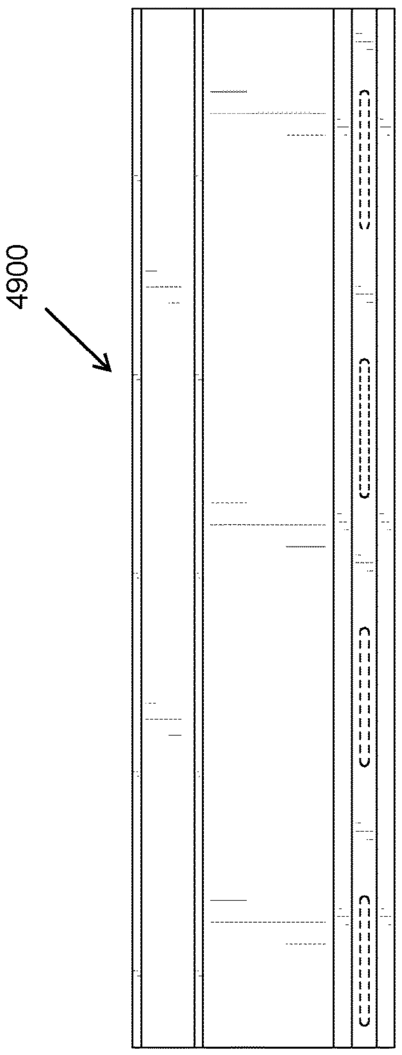

FIGS. 16 and 17 are side views of other embodiments of self-adhering casing beads;

FIG. 18 is a side view of another embodiment of a self-adhering casing bead;

FIG. 19 is an elevation view of the front of the self-adhering casing bead of FIG. 18;

FIG. 20 is another side view of the self-adhering casing bead of FIG. 18, showing an optional colored strip and adhesive member disposed at the casing bead;

FIG. 21 is another side view of the self-adhering casing bead of FIG. 18, showing the optional colored strip and adhesive member;

FIG. 22 is a bottom view of the self-adhering casing bead of FIG. 18;

FIG. 23 is a top view of the self-adhering casing bead of FIG. 18;

FIG. 24 is a back side view of the self-adhering casing bead of FIG. 18;

FIG. 25 is a front side view of the self-adhering casing bead of FIG. 18;

FIGS. 26 and 27 are perspective views of a casing bead having a ventilation cavity, a perforated attachment flange, and a spacing member;

FIGS. 28A-28F are views of the casing bead of FIGS. 26 and 27;

FIGS. 29A and 29B are views of a casing bead having a ventilation cavity and a perforated attachment flange;

FIGS. 30A-30C are views of a casing bead having a ventilation cavity and a spacing member; and FIGS. 31A and 31B are views of a casing bead having a ventilation cavity.

DESCRIPTION OF THE PREFERRED EMBODIMENTS

The present invention system significantly reduces the time and costs necessary to install smooth finishes where stucco or plaster meets window or door frames or jambs. The self-adhering casing bead includes a spacing member disposed at a stop bead wall of the casing bead, the spacing member including a convex surface spaced from the stop bead wall and at least one adhesive member disposed at the spacing member.

Figure 1:
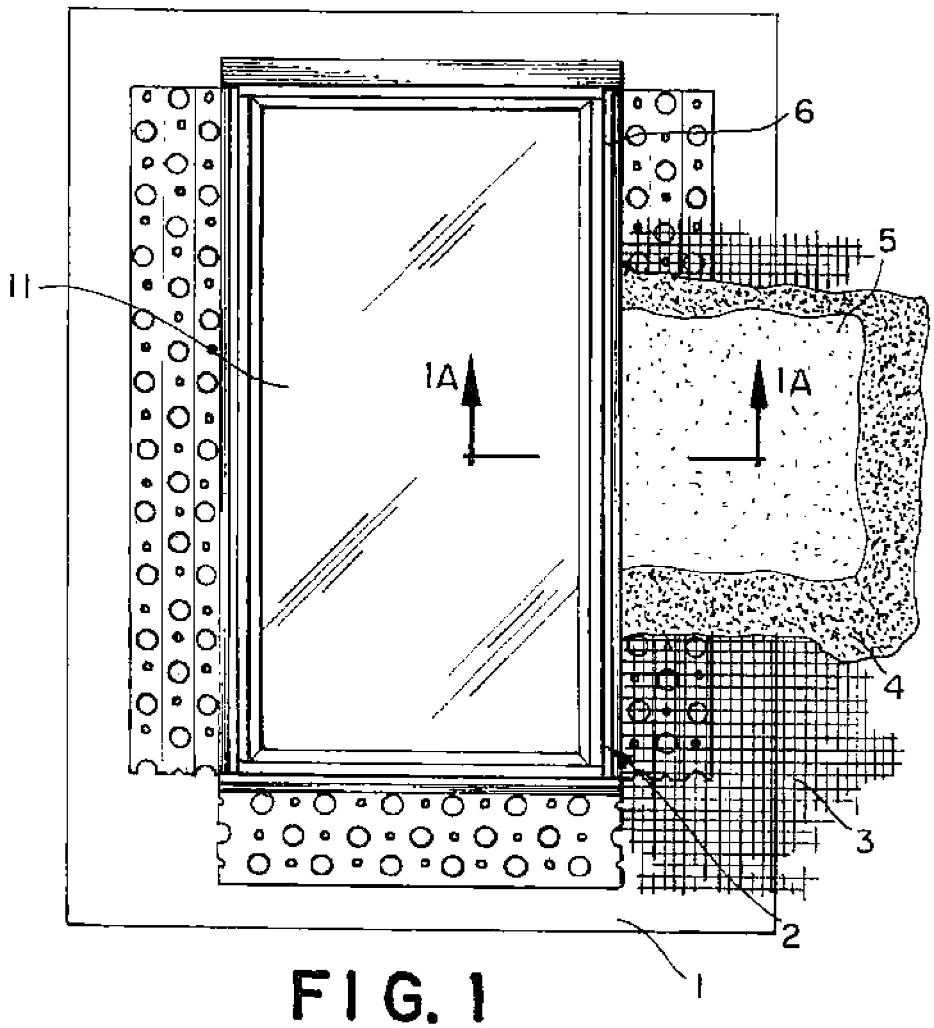
FIG. 1 PRIOR ART
FIG. 1 shows the typical manner in which stucco or plaster will be applied and installed in homes or other buildings around window or door frames or adjacent to other surfaces such as aluminum siding using the prior art L-Bead system.
Figure 1A:
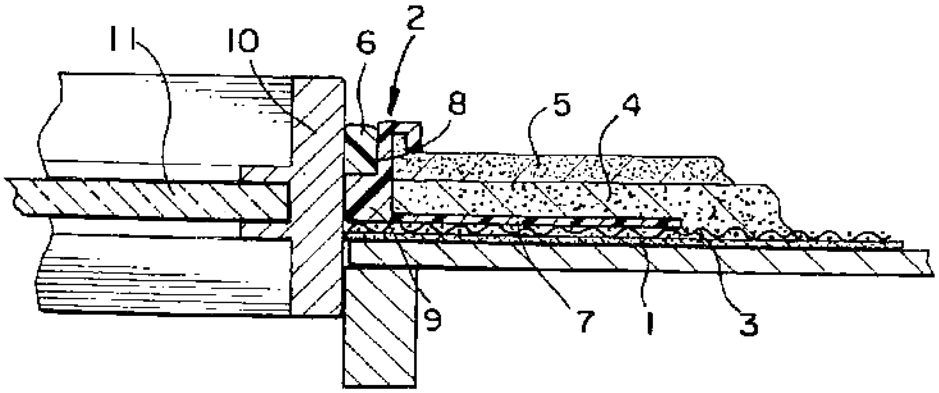
FIG. 1A PRIOR ART
FIG. 1A is a view in cross-section taken along the lines and arrows 1A-1A, illustrating the stop or stop bead 2 mounted along a jamb 10 of a window 11.

In typical building construction, exterior and interior surfaces are often made of stucco, plaster or adhered stone. The method of installation of these materials is generally consistent in the construction business and usually involves the installation of a felt layer 1 over the backing wall (plywood or similar material), a galvanized wire (or lathe) layer 3, and both scratch 4 and finish coats 5 of stucco or plaster (FIG. 1). Such construction occurs in layers. A wire mesh layer of galvanized wire 3 is anchored over felt paper 1 to the backing wall (usually plywood or a similar material). Scratch 4 and finish 5 coats of plaster or stucco are applied to the wire layer. Where the stucco or plaster meets a window or door jamb or another surface, plastic L-Bead stopping strips 2 are nailed to the backing wall behind or adjacent to the galvanized wire layer. The edge of the stop closest to the jamb is raised to contain the stucco or plaster and keep it away from the jamb or frame 10 (FIG. 1A).

Leaking and other problems often occur where the stucco, adhered stone (mortar) or plaster finish aligns with other design constructs of the home or building, such as windows, soffits or doors. Stop strips which contain and form the outer boundaries of the stucco or plaster surfaces where they meet window, soffit or door jambs have been developed to improve the seal and finishes of these adjacencies. In particular, the use of standard plaster stop strips as shown in FIGS. 2 and 4 has become standard practice in the stucco and masonry business. Plaster stop strips routinely consist of a thin, 2-inch wide strip 7 of plastic which is perforated throughout its length and which contains an edge strip 8 of plastic approximately ½ inch high running along one side of the strip 7. The top ¼ inch of this additional plastic strip 8 is then bent back over the wide, perforated portion strip 7 forming a “lip” which runs along the entire length of the stop. See FIG. 2. When the plaster stop strip is nailed to the backing wall, it is installed approximately W inch away from the jamb or other surface. The lip side contains and holds the stucco or plaster in place providing a smooth, straight edge.

Because traditional plaster stop must be installed W inch from the jamb for it to perform properly, there remains a ¼ inch gap running the entire length of the adjacency between the stucco and the door or window jamb. In typical construction, the worker typically installs the plaster stop A inch from the edge of the door or window jamb. The resulting gap must be filled with a backer rod and properly caulked for the correct finish. Installation of the backer rod and additional caulking costs time and money, particularly where the architectural design calls for numerous windows, doors or other interruptions in stucco or plaster surfaces. In addition, this manner of construction has unfortunately resulted in frequent leaking problems around windows and doors.

A system which eliminates the need for installation of a backer rod by manufacturing an additional strip of plastic which is bound to the existing plaster stop and abuts directly against the jamb or other surface is known. For example and as shown in FIGS. 3 and 5, the prior art L-Bead system (as described in U.S. Pat. No. 9,279,247, which is hereby incorporated by reference herein in its entirety) significantly modified both the existing plaster stop unit itself and the ease of installation.

The prior art L-Bead system (as described in U.S. Pat. No. 9,279,247) altered traditional plaster stop by adding a separate backing strip 9 to the existing plaster stop. The additional length of plastic stripping 9 is attached to the outside of the lip and runs along the entire length of the stop 2 (FIG. 3). Whereas the original plaster stop contained the stucco or plaster, the prior art L-Bead system not only contains the stucco or plaster, but also provides a backing strip 9 which abuts directly against the jamb 10 or other surface and thereby eliminates the need for (and serves the purpose of) a backer rod and additional caulking. Because the additional backing strip 9 is located lower than the lip containing the stucco, it can account for variations in the jamb 10 or other surface. The prior art L-Bead System taught a simple and thin caulking 6 over the L-Bead, where it meets the jamb 10 or other surface, making for a smooth, leak-proof finish.

In reference to FIGS. 6 and 7, another prior art embodiment of the stop bead is shown (as described in U.S. Pat. No. 9,279,247). In this alternative embodiment, a stop bead 102 is provided for mounting on a wall having a jamb formed therein to separate the jamb from plaster or stucco material 4, 5 during application of the plaster or stucco material 4, 5 to the wall. The jamb is part of a frame for a window or door that frames an opening in the wall, and the jamb has a first surface facing the opening in the wall and a second surface facing away from the opening in the wall. Stop bead 102 has a first side end portion 113, and a second side end portion 115, a top end portion, and a bottom end portion 116 at the end of the stop bead 102 opposite the top end portion. The first side end portion 113 has a leading edge 117 for engaging the second surface of the jamb when the stop bead 102 is mounted adjacent to the jamb.

The stop bead 102 has a base panel 107 having a front face over which plaster or stucco material 4, 5 is applied after the stop bead 102 is mounted adjacent to the jamb. The base panel 107 has perforations formed therein. A stop bead wall 108 is formed on the base panel 107 and extends outwardly above the front face of the base panel 107. The stop bead wall 108 has a first side having an engaging surface 119 for engaging plaster or stucco material 4, 5 after the stop bead 102 has been mounted adjacent to the jamb, and the stop bead wall 108 has a second side having a jamb facing surface 121 that faces the second surface of the jamb when the stop bead 102 is mounted adjacent to the jamb.

A spacing member 109 is formed on the stop bead 102 and extends outwardly away from the jamb facing surface 121 of the stop bead wall 108. The spacing member 109 comprises a strip of flexible (and also resilient) material (e.g., a plastic or a polymer, such as flexible vinyl (a flexible exterior grade vinyl; or a metal)), and may be formed on the stop bead wall 108 by co-extruding the spacing member 109 with the remainder (which comprises a material that is compatible for co-extrusion with the material used for the spacing member 109, such as a rigid exterior grade vinyl which is compatible with a flexible exterior grade vinyl if a flexible exterior grade vinyl is used for the spacing member 109, or a rigid metal if a flexible metal compatible to the rigid metal is used for the spacing member 109) of the stop bead 102, such that the entire stop bead 102, including the spacing member 109, is extruded as one piece. As shown in FIGS. 6 and 7, the spacing member 109 forms a hollow tube having a substantially rectangular cross-section, and four walls 123, 125, 127, and 129, with the wall 129 being part of the stop bead wall 108 and walls 123, 125, and 127 being part of the spacing member 109. The wall 125 is somewhat concave.

The stop bead 102 is two inches wide and about % inches high (at the stop bead wall 108), and the width of the spacing member 109 (the distance between the stop bead wall 108 and the jamb when the stop bead 102 is mounted adjacent to the jamb) is ¼ inch to ½ inch, such as ⅜ inch. Also, the distance from the top of the spacing member 109 to the top of the stop bead wall 108 is A inch.

Typically, window units are vinyl or vinyl clad, or aluminum or aluminum clad, and likely to expand and contract due to changes in the weather. Further, door units often have some expansion and contraction due to changes in the weather. Because the spacing member 109 is flexible and resilient, it permits movement of the jamb due to expansion or contraction of the window unit or door unit. Accordingly, if the jamb moves outwardly toward the stop bead 102 due to expansion of the window unit or the door unit it forms a part of, the jamb compresses the resilient, flexible spacing member 109 toward the stop bead wall 108, thereby accommodating for the expansion. The concave wall 125 helps facilitate the compression of the spacing member 109.

The spacing member 109 forms the leading edge 117 of the first side end portion 113 of the stop bead 102, and the leading edge 117 has a jamb engaging surface 131 that engages the second surface of the jamb when the stop bead 102 is mounted adjacent to the jamb. When the stop bead 102 is mounted adjacent to the jamb, with the jamb engaging surface 131 abutting against the second surface of the jamb, the stop bead wall 108 is spaced a uniform, predetermined distance from the second surface of the jamb. Further, the spacing member 109, in conjunction with the jamb and the jamb facing surface of the stop bead wall 108, form a caulk receiving area 133 above the spacing member 109 and between the second surface of the jamb and the jamb facing surface of the stop bead wall 108 for receiving caulk 6 to seal between the stop bead 102 and the jamb.

Bond-breaking tape 135 is fixed to the outer surface of wall 123 by laying it onto the outer surface of the wall 123 as the stop bead 102 exits the extruder. The bond-breaking tape 135 hinders formation of a bond between the caulk 6 and the bond-breaking tape 135. Accordingly, the caulk 6 positioned in the caulk receiving area 133 bonds only with the jamb and the jamb facing surface of the stop bead wall 108, thereby creating a double-sided joint (e.g., caulk 6 connected to the jamb and the jamb facing surface of the stop bead wall 108), rather than a triple-sided joint (e.g., caulk 6 connected to the jamb, the jamb facing surface of the stop bead wall 108, and the spacing member 109), to seal between the stop bead 102 and the jamb.

In addition to providing means for spacing the stop bead wall 108 a uniform and predetermined distance from the second surface of the jamb when the stop bead 102 is mounted adjacent to the jamb, and to creating a caulk receiving area 133 in conjunction with the jamb and the jamb facing surface 121 of the stop bead wall 108 when the stop bead 102 is mounted adjacent to the jamb, the spacing member 109 provides means for accommodating movement of the jamb due to expansion or contraction of the window unit or door unit, of which the jamb is a part, due to changes in the weather.

To assist in containing the plaster or stucco material 4, 5, the stop bead wall 108 has a flange 137 formed in its upper end portion, having a first portion that extends laterally away from the stop bead wall 108 and over the base panel 107 and a second portion extending from the first portion downwardly toward the base panel 107. U.S. Pat. No. 9,279,247 describes a wall having (1) a jamb formed therein, the jamb being part of a frame that frames an opening in the wall, and the jamb having a first surface facing the opening in the wall and a second surface facing away from the opening in the wall, and (2) a stop bead 102 mounted on the wall, with the spacing member 109 abutting against the second surface of the jamb, caulk 6 positioned in the caulk receiving area 133 and contacting the stop bead 102 and the jamb to form a seal between the stop bead 102 and the jamb, and a plaster or stucco material applied to the wall and separated from the jamb by the stop bead 102. The stop bead 102 is provided with bond-breaking tape 135 mounted on the wall 123 of the spacing member 109.

In use, the stop bead 102 (as in U.S. Pat. No. 9,279,247) is mounted adjacent to the jamb such that the spacing member 109 abuts against the second surface of the jamb to create a straight and uniform gap between the jamb facing surface of the stop bead wall 108 and the jamb, thereby, uniformly spacing the stop bead wall 108 from the second surface of the jamb and forming the caulk receiving area 133 for receiving caulk 6 to seal between the stop bead 102 and the jamb. To seal against leaks between the stop bead 102 and the jamb, caulk 6 is applied to and extends between the stop bead 102 and the jamb in the caulk receiving area 133 to form a seal between the stop bead 102 and the jamb. Plaster or stucco material 4, 5 is applied to the wall and kept separated from the jamb by the stop bead wall 108.

The prior art L-bead system described in U.S. Pat. No. 9,279,247 provides uniform spacing of a stop bead wall from the second surface of the jamb, since the stop bead wall 108 of the stop bead 102 is spaced a uniform, predetermined distance (the width of the spacing member 109) from the jamb. The stop bead 102 separates the jamb from the plaster or stucco material being applied to the wall by blocking access to the jamb with its stop bead wall 108. The stop bead 102 also provides for sealing against leaks between the stop bead 102 and the jamb by permitting simply caulking to obtain a seal between the stop bead 102 and the jamb.

The L-Bead system (as described in U.S. Pat. No. 9,279,247) is a system for use as a plaster or stucco stop where the plaster or stucco meets a separate surface such as window or door frames or jamb. Typical plaster stop in the stucco masonry industry consists of a perforated strip running parallel to the jamb with a plastic edge acting to contain the applied plaster or stucco surface. Traditional plaster stop is routinely installed approximately A inch away from the jamb in order to account for differences in the raised height of the jamb or other surface. The resulting gap or space requires the installation of a backer rod between the plaster stop and the edge of the jamb. This requires additional construction costs and can cause considerable potential for leaks. The L-Bead system provided a stop system which eliminated the need for the installation of a backer rod and thereby reduces the potential for leaks. The L-Bead system added an additional plastic strip to the back and along the length of the stop. The L-Bead is installed flush against the jamb, eliminating the need for a backer rod, and requiring only a small amount of caulking over the area for a finished job. This new system will save time and money and will significantly reduce the potential for leaks in these areas.

The present invention represents a further advancement in the art, providing an apparatus that is self-adhering and self-sealing. It eliminates the need for backer rod and caulking. This has eliminated the need for caulking at certain points and further reduced the potential for leaks. The new system results in even greater time and money savings and ease of installation. Turning to FIGS. 9-15, the present invention will be described in greater detail.

As shown in FIGS. 9-15, a casing bead includes a base panel 900, a stop bead wall 924 formed with the base panel 900 and extending from (and generally normal to) a front face 902 of the base panel. A flange 934 extends from the stop bead wall 924 above the front face of the base panel. A spacing member 1004 is disposed at and along a second side 932 of the stop bead wall 924 and has a surface or wall 1011 spaced from the stop bead wall by opposite side walls or support arms 1001, 1003. As discussed further below, the surface 1011 may comprise any suitable shape or configuration, such as a convex surface, a concave surface, a flat surface, or the like. For example, as shown, the surface or wall 1011 comprises a convex wall 1011. The spacing member has a hollow construction and is attached to the stop bead wall via the pair of side walls or support arms, referred to as a first side wall or support arm 1001 and a second side wall or support arm 1003. The wall 1011 is integrally formed with the support arms and spaced from the stop bead wall via the support arms, and the spacing member may be integrally formed with, or extruded from, the stop bead wall or may be separately attached thereat. For example, the base panel 900, stop bead wall 924 and flange 934 may be formed (such as integrally formed as a unitary component) and the spacing member 1004 may be attached to the stop bead wall 924 such as via adhesive or heat welding.

The first and second support arms 1001, 1003 have respective outer surfaces 1007, 1013 and respective inner surfaces, the inner surfaces defining a hollow or space between the second side 932 of the stop bead wall and the convex wall 1011. The first and second support arms 1001, 1003 extend from the second side of the stop bead wall and are substantially perpendicular with the stop bead wall. At the contact point between the stop bead wall and the spacing member, a first foot or leg 1009 at the first support arm 1001 and a second foot or leg 1015 at the second support arm 1003 may be integrally formed with the respective support arms to increase the contact surface between the spacing member and the stop bead wall. The spacing member is disposed along the stop bead wall with the outer surface 1007 of the first support arm 1001 offset from the top of the stop bead wall 926 (such as by 3⁄16 of an inch) so that, when the casing bead is disposed at a wall against a jamb, caulk or sealant material may not be necessary to provide a full and reliable seal between the wall and the jamb near the surface of the wall. However, the outer surface 1007 of the first support arm may be configured to receive caulk or a sealant material, such as via a non-adhesive layer or coating, such as bond-breaking tape, disposed thereat.

Optionally, an adhesive member 1021 (such as an adhesive strip or foam or tape such as double sided tape) may be disposed at the spacing member so that when the casing bead is installed at a vertical wall and/or horizontal surface perpendicular to the vertical wall (such as door or window jamb at the wall), the adhesive member may engage the vertical wall and/or horizontal surface to retain the casing bead at the wall and/or jamb at which the casing bead is being installed. For example, the adhesive member may include an adhesive foam adhered to the spacing member, such as via a secondary adhesive or glue. The adhesive member may be disposed at the spacing member at any suitable time before the casing bead is installed at the wall structure. For example, the adhesive member may be disposed at the spacing member during the manufacturing process (and may be formed with the casing bead or attached to the formed casing bead) or the adhesive member may be disposed at the spacing member immediately prior to installing the casing bead at the wall structure. For example, a user may attach double sided tape to the spacing member and then attach the casing bead to a window jamb.

The casing bead may be installed such that the base panel 900 is disposed along the wall or vertical wall structure and the spacing member (and more particularly the convex surface or wall of the spacing member) abuts the horizontal surface of the jamb perpendicular to the vertical wall structure. The adhesive member 1021 may be disposed at the wall 1011 of the casing bead so as to engage the jamb when the casing bead is installed. The adhesive member may be at least partially conformable so that, no matter the configuration of the spacing member, the adhesive member attaches the casing bead to the jamb. Thus, the adhesive member 1021 engages the surface of the jamb and conforms to the jamb to secure the casing bead at the jamb.

Material from the wall adjacent the jamb (plaster or stucco) covers the base panel and is retained via the stop bead wall and flange. As the jamb expands (such as due to temperature changes), the jamb expands against the spacing member 1004, which flexes to accommodate the expansion of the jamb. The adhesive strip or member 1021 at the convex surface of the spacing member maintains the contact between the spacing member and the jamb as the jamb expands against the spacing member and contracts away from the spacing member.

Additionally, an adhesive member 1023 may be disposed at the rear face 1002 of the base panel to retain the base panel at a portion of the wall at which the casing bead is being installed. The adhesive strip at the base panel helps to hold the base panel in place at the wall to which the casing bead is being installed. For example, the adhesive strips may retain the base panel at a layer of the pre-finished wall prior to a nail being driven through the base panel and prior to the stucco or plaster placed over the base panel. Installation of the casing bead at the wall via the one or more adhesive members at the spacing member and base panel may also eliminate the requirement of driving a nail through the base panel. The adhesive member 1023 may be disposed at any suitable location on the rear face of the base panel.

Optionally, the casing bead may not include a spacing member and the adhesive member may be disposed at an outer surface of the stop bead wall 924 so that, if the casing bead is installed at a terminal edge of a vertical wall structure, such as at a window or door jamb, the adhesive member at the stop bead wall 924 may retain the casing bead at the jamb. For example, a casing bead without a spacing member and with an adhesive member disposed at an outer surface of the stop bead wall may be used in vinyl-siding applications or cement board siding applications.

The base panel 900 includes at least one opening between the front face 902 and the rear face 1002. For example, openings 906, 908, 910, 912, 914, 916, 918, 920, and 922 are disposed in the base panel 900. Optionally, the base panel 900 may include one or more row of openings, such as a first row of openings, a second row of openings, and a third row of openings. The one or more rows of openings may each comprise a pattern and extend substantially across the base panel. The casing bead may comprise any suitable length, and multiple casing beads may be aligned next to one another, so that one or more casing beads may abut the entirety of a jamb at which they are installed.

With reference to FIG. 9, the first support arm provides a left side of the spacing member, the second support arm provides a right side of the spacing member, and the convex surface or wall provides a bottom of the spacing member. Thus, the self-adhering casing bead apparatus comprises, for example, the base panel 900 having the front face 902, the rear face 1002 and at least one opening (e.g., 906, 908, 910, 912, 914, 916, 918, 920 and 922). The stop bead wall 924 has a top 926 and a bottom 928, the bottom 928 formed on the base panel 900 and the stop bead wall 924 extending from the front face 902 of the base panel 900, the stop bead wall 924 having the first side 930, the second side 932 and the flange 934 extending from the top 926 and at least partially above the front face of the base panel; the spacing member 1004 having the left side 1007, the left leg 1009 in communication with the left side 1007, the convex bottom 1011, the right side 1013 and the right leg 1015 in communication with the right side 1013, wherein the left side 1007 is offset 1005 from the flange 934, and wherein the left leg 1009 and the right leg 1015 are in communication with the second side of the stop bead wall 932; and at least one adhesive strip 1021 and 1023 in communication with the spacing member 1004. The left side may be offset from the flange 3⁄16 of an inch. There may, optionally, be at least one adhesive strip 1021, which may be double sided tape in communication with the convex bottom 1011 of the spacing member 1004.

There may, optionally, be additional adhesive strip(s) which may be double sided tape in communication with the rear face 1002 of the base panel. The base panel has a proximal end or portion 950 proximal to stop bead wall 924 and a distal end or portion 952 distal from the proximal end 950 and the at least one adhesive strip 954 may be attached to and along the distal portion 952, the proximal portion 950 (as shown in FIG. 9) or anywhere in between on the base panel at the rear face of the base panel. In other words, the stop bead wall 924 may be formed at an end or portion 950 of the base panel (and extend from the front face of the base panel at the end 950) and the adhesive member may be disposed at the rear face 1002 of the base panel 900 at the proximal end 950 of the base panel relative to the stop bead wall 924, the adhesive member may be disposed at the rear face 1002 of the base panel 900 at the distal end 952 of the base panel relative to the stop bead wall 924, and/or the adhesive member may be disposed at any suitable portion at the rear face 1002 of the base panel 900.

The base panel 900 typically has at least two rows of openings. For example, FIG. 9 depicts three rows of openings. The openings may be circular, oblong, triangular, rectangular or square without departing from the scope of the present invention. The base panel 900 has a first row of openings 906, 908, 910, second row of openings 914 and 916 and a third row of openings 918, 920 and 922, wherein the first row of openings and the second row of openings are alternating sizes of a first size opening (e.g. larger sized openings 906, 910, 914, 918 and 922) and a second size opening (e.g. smaller sized openings 908 and 916). The rows of openings may be alternating sizes (e.g. first row of openings having a first size opening 906, second size opening 908 and first size opening 910. The cut in the middle portion of the apparatus is intended to depict that the apparatus may be of any length suitable for the environment. Multiple self-adhering casing beads may also be aligned end to end to suit the environment. There may also be at least one oblong opening 912 at opposing ends of at least one row of the at least two rows of openings. The oblong opening 912 may be used to further secure the casing bead. A nail fastener may be fastened through the oblong openings.

The rows of openings may also be staggered. This is to say that the second size opening 908 is above a first size opening 914 in the row below it. The third row of openings 918, 920 and 922 may have alternating openings of the first size opening 918 and 922 and a third size opening 920. The third size opening 920 may be the smallest size opening and is closer to the stop bead wall 924 than the openings 914 and 908. The third row of openings, as in each of the rows, may be staggered from the row above or below it (in this case the second row of openings 912, 914 and 916).

FIGS. 16-18 depict self-adhering casing beads 1600, 1700, and 1800 according to embodiments of the present invention with examples of dimensions for illustrative purposes. The height or depth (measured from the rear face of the base panel to the top of the stop bead wall) of the casing bead embodiments 1600 and 1700 differs (where the casing bead 1600 has a height dimension 1660 of, for example, about 0.875 inches, and the casing bead 1700 has a height dimension 1760 of, for example, about 0.750 inches), while the dimensions of the spacing member or flexible bulb may be the same between the embodiments. The spacing member is offset from the top of the stop bead wall in both embodiments by an offset dimension 1662, 1762 of, for example, 0.063 inches (and similarly, embodiment 1800 also has an offset dimension 1862 of 0.063 inches). Thus, casing bead 1600 may accommodate a thicker or deeper layer of stucco or plaster than casing bead 1700 (as accommodated by the height or depth of the casing bead and retained via the flange), but the depth of the outer surface of the first support leg from the top of the stop bead wall is consistent between the embodiments 1600, 1700, and 1800. Thus, the depth of caulk or sealant optionally disposed thereat may also be similar.

Additionally, the casing beads 1600, 1700, and 1800 include spacing members 1604, 1704, 1804 with partially convex surfaces or walls 1611, 1711, 1811 spaced from the stop bead walls 1624, 1724, 1824 via support arms or walls. In each illustrated embodiment, the partially convex surface is spaced from the stop bead wall by, and integrally formed with, a first support arm 1601, 1701, 1801 and a second support arm 1603, 1703, 1803. The partially convex surface includes lateral flat portions 1611*a*, 1711*a*, 1811*a* and a central convex bulb portion 1611*b*, 1711*b*, 1811*b* abridging the flat portions, where the first and second support arms extend from the outermost ends of the partially convex surface at the respective flat portions. The first and second support arms are disposed at (such as attached to or integrally formed with) the stop bead wall. An adhesive member 1621, 1721 (such as double sided tape) is disposed at and conforms to the partially convex surface for adhesion of the casing bead to a jamb (as shown in FIGS. 19-25, the casing bead 1800 may also have such an adhesive strip disposed along the partially convex surface or wall 1811).

Additionally, the casing bead may include a colored strip or portion 1664, 1764, 1864 that is disposed at an exterior surface of the casing bead, such as along the second side of the stop bead wall and an outer surface of the flange, and that may be co-extruded as part of the casing bead. The colored strip 1664, 1764, 1864 may be disposed at the exposed surface (or surfaces) of the casing bead to provide a selected color at the exposed surface. Thus, the casing bead may comprise a selected color at the exposed surfaces (i.e., viewable exterior the wall when the casing bead is disposed at a wall and at least partially covered over with stucco or plaster) and a second or default color at the surfaces that may be hidden or covered when the casing bead is installed at a wall.

As shown in FIG. 18, the self-adhering casing bead 1800 includes a spacing member having first and second support arms 1807, 1813 where the first and second support arms have differing thicknesses (compare, for example, to the spacing members 1604, 1704 of the casing beads 1600, 1700, which have first support arms 1601, 1701 and second support arms 1603, 1703 having the same or about the same thicknesses). In the illustrated embodiment, the second support arm 1803 has a thickness of, for example, 0.025 inches and the first support arm 1801 has a thickness of, for example, 0.035 inches. The thicker wall and thinner wall allows for collapsing of the bulb toward the thinner wall and reduces or avoids or limits collapsing of the thicker wall. Thus, when a force is applied on the spacing member (such as from an expanding door or window jamb), the spacing member will flex or bend towards and/or at the second (thinner) support arm and flexing and/or bending of the first (thicker) support arm will be reduced or eliminated. This reduces risk of breaking the seal provided by caulking disposed at the outer surface 1807 of the first support arm. In other words, when the jamb expands and presses against the spacing member, the spacing member is biased towards collapsing at the second support arm (because of its lesser thickness) and thus will not collapse (or will be less likely to collapse) towards the first support arm under the typical forces of an expanding jamb.

As shown in FIGS. 18-25, the self-adhering casing bead 1800 with a spacing member having first and second support arms 1807, 1813 of differing thicknesses includes a base panel, a stop bead wall 1824 formed with the base panel and extending from (and generally normal to) a front face 1802 of the base panel. A flange 1834 extends from the stop bead wall 1824 above the front face of the base panel. The base panel includes at least one opening between the front face and a rear face. For example, openings 1806, 1808, 1810, 1812, 1814, 1816, 1818, 1820, and 1822 are formed through the base panel. Optionally, the base panel may include one or more row of openings, such as a first row of openings, a second row of openings, and a third row of openings. The one or more rows of openings may each comprise a pattern and extend substantially across the base panel.

Optionally, an adhesive member 1821 may be disposed at the spacing member, such as at the partially convex surface 1811, to retain the casing bead at the wall and/or jamb at which the casing bead is being installed. Additionally, an adhesive member may be disposed at the rear face of the base panel to retain the base panel at a portion of the wall at which the casing bead 1800 is being installed. The adhesive member may be disposed at any suitable location at the rear face of the base panel, such as at a proximal end or portion 1850 of the base panel proximal to the stop bead wall 1824 or a distal end or portion 1852 of the base panel distal from the proximal end.

Optionally, the self-adhering casing bead may, instead of having a J-shaped flange or lip at an end of the stop bead wall distal from the base panel, include a planar stop bead wall, such as for use of the casing bead in siding applications. Thus, where a J-shaped flange may be configured to receive excess stucco or plaster material of a wall at which the casing bead is installed to retain the casing bead at the wall and provide a flush or neat or uniform-looking seam between the wall and the casing bead, a planar stop bead wall allows the wall covering material (such as vinyl siding) to directly abut the casing bead. When the casing bead includes a planar stop bead wall, the top edge of the stop bead wall may still be offset from the top surface (first support arm) of the spacing member to accommodate placement of a caulk or sealant at the seam between the jamb and the casing bead.

As discussed above, a casing bead disposed at a jamb (such as a window or door jamb) or an edge of a vertical wall structure provides a terminal edge for finishing material of the wall, such as stucco, plaster, vinyl, manufactured stone, or the like. However, moisture or vapor may become trapped interior the wall (i.e., behind the finishing material) and the terminal edge may not allow the moisture or vapor to escape the wall. A ventilation screed (such as a ventilation screed utilizing features of the ventilation screeds of U.S. Pat. No. 11,180,913, which is hereby incorporated herein by reference in its entirety) may be used in conjunction with a casing bead to provide a terminal edge of the finishing material and a ventilation pathway for moisture to escape the wall. Ventilation screeds can be installed at or over a drainage plane (such as a rain screen) attached at the backing wall (such as plywood), and behind finishing layers of the vertical wall structure, such as galvanized wire or lathe and stucco or plaster.

As shown in FIGS. 26-28F, a casing bead 1900 configured for mounting at a vertical wall structure may provide both a terminal edge for finishing material of a vertical wall structure and a ventilation pathway for moisture that may be trapped interior the wall. The casing bead 1900 is configured for mounting at an upper edge portion of the vertical wall structure, but may also be mounted at other suitable positions of the wall, such as at door or window jambs or other edges of the wall.

The casing bead 1900 may include a base panel or attachment flange 1902 having a first or front surface 1902*a* and a second or rear surface 1902*b* opposite the front surface and separated from the front surface by a thickness of the attachment flange. As discussed further below, the rear surface 1902*b* is configured for attachment at a surface of the vertical wall structure at which the casing bead 1900 is mounted. For example, the casing bead 1900 may be mounted to the backing wall of the wall. The front surface 1902*a* of the attachment flange 1902 is configured to receive one or more additional layers of the wall structure, such as a rain screen, a galvanized wire, lathe or a scratch coat of plaster.

Optionally, the attachment flange 1902 may include one or more apertures or perforations 1904 through the thickness of the attachment flange. The one or more perforations 1904 may be configured to receive fasteners (such as nails or screws) for mounting the casing bead 1900 at the vertical wall structure. The perforations 1904 may comprise any suitable configuration. For example, the perforations 1904 are shown as including upward pointing triangles, downward pointing triangles, and circles, and could also include square or rectangular shapes or any other suitable shape. Optionally, the rear surface of the attachment flange may include adhesive, such as double sided tape, for attaching the casing bead at the vertical wall structure.

A bead wall or ventilation spacer or ventilation flange 1906 extends from the front surface 1902*a* of the attachment flange 1902. The ventilation flange 1906 may be formed with the attachment flange 1902 and may extend generally normal to the front surface 1902*a* of the attachment flange. Thus, when the casing bead 1900 is attached at the upper edge portion of the vertical wall structure, the attachment flange 1902 is substantially parallel to the vertical wall structure and the ventilation flange 1906 is substantially perpendicular to the vertical wall structure and extends away from the attachment flange and the vertical wall structure.

An outer ventilation flange 1908 may extend from an outer portion or outer edge region or outer end of the ventilation flange 1906 distal from the attachment flange 1902 such that the outer ventilation flange 1908 extends along and is spaced from the attachment flange 1902. In other words, the outer ventilation flange 1908 may extend from the ventilation flange 1906 substantially perpendicular to the ventilation flange 1906 and parallel to the attachment flange 1902. The outer ventilation flange 1908 may be substantially J-shaped such that a lip or distal end 1908*a* of the outer ventilation flange 1908 extends from an end of the outer ventilation flange distal the ventilation flange 1906 and towards the attachment flange 1902.

A stop bead wall or stop bead wall flange 1924 may extend from an inner surface of the outer ventilation flange 1908 and toward the attachment flange 1902 and substantially parallel and spaced from the ventilation flange 1906. The stop bead wall 1924 extends toward the attachment flange 1902, and a terminal end of the stop bead wall 1924 distal the outer ventilation flange 1908 is spaced from the attachment flange 1902 such that the stop bead wall 1924 does not extend to, engage, or join the attachment flange 1902.

The stop bead wall 1924, the outer ventilation flange 1908, and the ventilation flange 1906 cooperate to define a three-sided ventilation cavity 1910 configured to provide a pathway for moisture to escape from interior the wall. As shown, the ventilation cavity 1910 comprises a U-shaped channel along the upper edge portion of the casing bead 1900 so that, with the casing bead 1900 mounted at the upper edge region of the vertical wall structure, the casing bead 1900 may provide a ventilation pathway at the upper edge region of the vertical wall structure. The open end of the U-shaped ventilation cavity 1910 faces the attachment flange 1902 so as to allow moisture or vapor to travel from the wall along the attachment flange 1902 and through the ventilation cavity 1910.

One or more ventilation openings 1912 are formed through a surface of the ventilation cavity 1910 to allow moisture to escape the ventilation cavity. For example, the one or more ventilation openings 1912 may be formed through the stop bead wall 1924. The one or more ventilation openings 1912 may comprise any suitable shape or configuration and may be uniformly spaced along the length of the casing bead 1900. For example, the one or more ventilation openings may be circular, elongated, rectangular, or any other suitable shape. The one or more ventilation openings 1912, when the casing bead 1900 is mounted at a vertical wall structure, are configured to be exposed exterior the wall. Thus, moisture may travel through the ventilation cavity and through the one or more ventilation openings exterior the wall.

Optionally, a ridge or lip or connector alignment member 1914 may extend within the ventilation cavity 1910 from the ventilation flange 1906 at a position between the attachment flange 1902 and the outer ventilation flange 1908 to allow a connector to seat tightly within the ventilation cavity 1910. The ridge 1914 may provide an upper barrier of the ventilation cavity 1910 so that moisture may condense and drip or drain through the one or more ventilation openings 1912. As shown, the ridge 1914 extends from the ventilation flange 1906 along the length of the casing bead 1910 and a distal end of the ridge distal from the ventilation flange 1906 is spaced from the stop bead wall 1924. Optionally, the ridge 1914 may protrude or extend from one or more surfaces of the ventilation cavity, such as from the ventilation flange 1906, outer ventilation flange 1908, and/or an upper surface of the stop bead wall 1924. The ridge 1914 may engage a connector or receive a corresponding channel or recess of a connector disposed within the ventilation cavity 1910, such as to align the connector within the ventilation cavity and secure the casing bead 1900 to the connector. Thus, the connector may be received in ventilation cavities of adjacent casing beads to align and secure the casing beads relative to one another.

As discussed above, the stop bead wall 1924 extends from the outer ventilation flange 1908 toward the attachment flange 1902 and substantially perpendicular to the attachment flange 1902 and the terminal or distal end of the stop bead wall 1924 distal from the outer ventilation flange 1908 is spaced from the attachment flange 1902. A first stop bead flange 1926 may extend from the stop bead wall 1924, such as at an inner edge region or the distal end of the stop bead wall, and along and spaced from the attachment flange 1902 and substantially parallel to the attachment flange 1902. The first stop bead flange 1926 extends along and spaced from the attachment flange in a direction away from the ventilation flange 1906. Thus, the first stop bead flange 1926 and the upper surface 1902*a* of the attachment flange 1902 may cooperate to define a channel or space through which moisture may travel from the wall and through the ventilation cavity.

A second stop bead flange 1928 may extend from the stop bead wall 1924 at a position between the first stop bead flange 1926 (e.g., at the terminal end of the stop bead wall) and the outer ventilation flange 1908. The second stop bead flange 1928 extends along and spaced from the attachment flange 1902 in a direction away from the ventilation flange 1906 and may extend substantially parallel to the attachment flange 1902 and the first stop bead flange 1926. The second stop bead flange 1928 may comprise a substantially J-shaped flange such that a lip or distal end 1928*a* of the second stop bead flange 1928 extends from an end of the second stop bead flange distal the stop bead wall 1924 and towards the attachment flange 1902.

The one or more ventilation openings 1912 may be formed through the stop bead wall 1924 at a position along the stop bead wall between the second stop bead wall flange 1928 and the outer ventilation flange 1908 (i.e., outboard or above the second stop bead flange) so that when the wall finishing material is received at the stop bead wall (i.e., inboard or below the second stop bead flange), the wall finishing material is received by the second stop bead flange and precluded from covering the one or more ventilation holes.

For example, when the casing bead 1900 is mounted or attached at the backing wall during the construction process of the vertical wall structure, a drainage plane may be installed at the first or front surface 1902*a* of the attachment flange with the second or rear surface 1902*b* engaging the backing wall. One or more additional layers, such as galvanized wire or lathe may be disposed at an outer surface of the drainage plane. Optionally, the one or more additional layers may be disposed between the outer surface of the drainage plane and the first stop bead flange 1926. Thus, the first stop bead flange 1926 may act as a guide for placement of the semi-porous layers to prevent placement of the finishing materials within the channel between the first stop bead flange 1926 and attachment flange 1902 and leading to the ventilation cavity 1910. The finishing material may be disposed at an outer surface of the one or more additional layers and above or outboard the first stop bead flange 1926. The finishing material may be disposed between the first stop bead flange 1926 and the second stop bead flange 1928, with the lip 1928*a* of the second stop bead flange 1928 retaining excess finishing material.

Optionally, the casing bead 1900 may include a spacing member 1930 extending from an upper or outer surface of the ventilation flange 1906. As shown, the spacing member 1930 is substantially square or rectangular in shape and defines a hollow cavity. However, the spacing member 1930 may comprise any suitable configuration, such as those described above. The spacing member 1930 is configured to, when the casing bead 1900 is mounted at an upper edge region of a vertical wall structure, engage a soffit or jamb or other surface above and perpendicular to the vertical wall structure and maintain a uniform spacing of the casing bead 1900 from the surface. Optionally, the spacing member 1930 may have an adhesive, such as a double sided tape, disposed at an outboard surface 1930*a* of the spacing member 1930 for attaching at a horizontal surface that is perpendicular to the vertical wall structure. The spacing member 1930 may be positioned at any suitable position along the ventilation flange 1906. For example, the spacing member 1930 may be positioned along the ventilation flange 1906 a suitable distance from the upper or outer end of the ventilation flange (i.e., the outer ventilation flange 1908) so that caulk or sealant or adhesive may be disposed at an outer surface 1930*b* of the spacing member 1930, thus sealing the casing bead 1900 to the upper surface above the vertical wall structure.

As shown in FIGS. 28A-31B, the casing bead may include the perforations through the attachment flange or the casing bead may have an attachment flange devoid of perforations. Also, the casing bead may include the spacing member or the casing bead may have a ventilation flange devoid of the spacing member. For example, FIGS. 28A-28F depict the casing bead 1900 that includes perforations 1904 through the attachment flange 1902 and the spacing member 1930. FIGS. 29A and 29B depict a casing bead 2900 that includes perforations and does not include a spacing member. FIGS. 30A-30C depict a casing bead 3900 that does not include perforations and includes a spacing member 3930. FIGS. 31A and 31B depict a casing bead 4900 that does not include perforations and does not include a spacing member. FIGS. 29A and 31A include exemplary dimensions of the casing bead. However, it should be understood that the casing bead may comprise any suitable dimensions dependent upon, for example, the application of the casing bead or the walling system with which the casing bead is utilized.

Thus, the casing bead 1900 provides a ventilation cavity and a casing bead stop wall so that moisture or vapor may escape from the interior of a vertical wall structure constructed with the casing bead 1900, the casing bead stop wall receiving the finishing material of the wall to provide a terminal edge of the wall and preclude the finishing material from covering or otherwise entering ventilation openings of the casing bead. The casing bead is configured to mount at an upper edge region of the vertical wall structure, but may be suitable for positioning at other positions along the wall, such as against a door or window jamb or at a lower or side edge region of the wall.

For illustrative purposes, the specification set out above uses the inventive stop bead in conjunction with a jamb of a window unit or door unit. However, the inventive stop bead may be used to separate plaster or stucco material from any material dissimilar from the plaster or stucco material, such as where plaster or stucco is to be separated from soffits, capping, or siding. As used herein, a jamb is part of a frame that frames an opening in a wall. Further, as used herein, a jamb includes a structure, such as soffits, capping, or siding, which is to be separated from plaster or stucco material with a stop bead.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A casing bead apparatus, the casing bead apparatus comprising:

a base panel configured for attaching at a vertical wall structure, wherein the base panel comprises at least one opening through the base panel, and wherein, with the base panel attached at the vertical wall structure, the base panel is disposed along the vertical wall structure;

a stop bead wall extending from the base panel, wherein the stop bead wall comprises a first side, a second side opposite the first side, and a flange at a distal end of the stop bead wall distal from the base panel and extending partially over the base panel;

a spacing element disposed at the second side of the stop bead wall;

wherein the spacing element comprises a convex surface spaced from the second side of the stop bead wall by a pair of side walls of the spacing element;

an adhesive element disposed at the convex surface of the spacing element;

wherein the adhesive element is configured to engage a horizontal surface perpendicular to the vertical wall structure, and wherein, with the base panel attached at the vertical wall structure, the adhesive element engages the horizontal surface perpendicular to the vertical wall structure to adhesively attach the casing bead apparatus at the horizontal surface; and wherein, with the adhesive element engaged with the horizontal surface, the spacing element is disposed between the stop bead wall and the horizontal surface.

2. The casing bead apparatus of claim 1, wherein the pair of side walls of the spacing element comprises a first side wall at the second side of the stop bead wall and a second side wall at the second side of the stop bead wall and spaced from the first side wall, and wherein the first side wall comprises a first thickness and the second side wall comprises a second thickness different from the first thickness.

3. The casing bead apparatus of claim 2, wherein the second thickness is less than the first thickness so that when the spacing element is compressed, the spacing element flexes at the second side wall.

4. The casing bead apparatus of claim 1, wherein the convex surface comprises a partially convex surface comprising a central convex bulb portion and first and second lateral flat surface portions.

5. The casing bead apparatus of claim 4, wherein the pair of side walls of the spacing element comprises a first side wall extending from the first lateral flat surface portion of the partially convex surface and a second side wall extending from the second lateral flat surface portion of the partially convex surface.

6. The casing bead apparatus of claim 1, wherein the adhesive element comprises double sided tape disposed at the convex surface of the spacing member.

7. The casing head apparatus of claim 1, wherein the flange extends partially over a first side of the base panel and further comprising a second adhesive element disposed at a second side of the base panel opposite the first side of the base panel.

8. The casing bead apparatus of claim 7, wherein the stop bead wall extends from the base panel at a first end of the base panel, and wherein the second adhesive element is disposed at the second side of the base panel at a proximal portion of the base panel proximal to the first end.

9. The casing head apparatus of claim 7, wherein the stop bead wall extends from the base panel at a first end of the base panel, and wherein the second adhesive element is disposed at the second side of the base panel at a distal portion of the base panel distal from the first end.

10. The casing bead apparatus of claim 1, wherein the second side of the stop bead wall comprises a colored portion having a selected color that is different from a color of the first side of the stop bead wall, and wherein the colored portion is co-extruded with the stop bead wall.

11. The casing bead apparatus of claim 1, wherein, with the adhesive element engaged with the horizontal surface, the adhesive element at least partially conforms to the horizontal surface.

* * * * *